United States Patent
Araki et al.

(10) Patent No.: US 8,014,931 B2
(45) Date of Patent: Sep. 6, 2011

(54) SECONDARY AIR SUPPLY SYSTEM AND VEHICLE

(75) Inventors: Yuuji Araki, Shizuoka (JP); Masaki Torigoshi, Shizuoka (JP); Hiroki Tanabe, Shizuoka (JP); Hitoshi Takikawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 410 days.

(21) Appl. No.: 12/275,531

(22) Filed: Nov. 21, 2008

(65) Prior Publication Data
US 2009/0171551 A1 Jul. 2, 2009

(30) Foreign Application Priority Data
Dec. 27, 2007 (JP) ................................. 2007-337493

(51) Int. Cl.
*F01N 3/22* (2006.01)
*F01N 3/34* (2006.01)

(52) U.S. Cl. ............................ 701/103; 60/305; 123/699
(58) Field of Classification Search .................. 701/103, 701/109; 123/699; 60/285, 289, 290, 304–306
See application file for complete search history.

(56) References Cited

U.S. PATENT DOCUMENTS

| | | | |
|---|---|---|---|
| 5,551,231 A | 9/1996 | Tanaka et al. | |
| 7,856,815 B2 * | 12/2010 | Demura et al. | 60/324 |
| 2005/0120711 A1 | 6/2005 | Koyama et al. | |
| 2007/0068145 A1 * | 3/2007 | Wassmur et al. | 60/289 |

FOREIGN PATENT DOCUMENTS

| | | |
|---|---|---|
| DE | 28 15 456 A1 | 10/1978 |
| JP | 05-106431 A | 4/1993 |
| JP | 2006-70718 A | 3/2006 |
| JP | 2006-183513 A | 7/2006 |

OTHER PUBLICATIONS

Official communication issued in counterpart European Application No. 08020762.4, mailed on May 4, 2009.
Araki et al.: "Secondary Air Supply System and Vehicle," U.S. Appl. No. 12/275,493, filed Nov. 21, 2008.

* cited by examiner

*Primary Examiner* — Erick Solis
(74) *Attorney, Agent, or Firm* — Keating & Bennett, LLP

(57) ABSTRACT

A secondary air supply system includes a CPU, a first air supply pipe, a second air supply pipe, a first shut-off valve, and a second shut-off valve. First ends of the first air supply pipe and the second air supply pipe are connected to an air cleaner box and the other ends thereof are connected to an exhaust port. The CPU controls opening/closing of the first shut-off valve and the second shut-off valve based on a state of an engine. The first shut-off valve and the second shut-off valve are selectively opened by the CPU, so that air in the air cleaner box is supplied to the exhaust port through the first air supply pipe and/or the second air supply pipe.

11 Claims, 15 Drawing Sheets

FIG. 9

| ENGINE SPEED (rpm) \ THROTTLE OPENING (deg.) | 0.49 | 0.98 | 1.5 | 1.95 | 3.05 | 4.03 | 5.98 | 8.06 | 10.01 | 11.96 | 14.04 |
|---|---|---|---|---|---|---|---|---|---|---|---|
| 1600 | 0 | 0 | 0 | 0 | 0 | 0 | 0 | 0 | 0 | 0 | 2 |
| 1800 | 0 | 0 | 0 | 0 | 0 | 0 | 0 | 0 | 0 | 0 | 2 |
| 2000 | 0 | 0 | 0 | 0 | 0 | 0 | 0 | 0 | 0 | 0 | 2 |
| 2250 | 0 | 0 | 0 | 0 | 0 | 0 | 0 | 0 | 0 | 0 | 2 |
| 2500 | 0 | 0 | 1 | 1 | 1 | 1 | 1 | 1 | 1 | 1 | 3 |
| 2750 | 0 | 0 | 1 | 1 | 1 | 1 | 1 | 1 | 1 | 1 | 3 |
| 3000 | 0 | 0 | 1 | 1 | 1 | 1 | 1 | 1 | 1 | 1 | 3 |
| 3250 | 0 | 0 | 1 | 1 | 1 | 1 | 1 | 1 | 1 | 1 | 3 |
| 3500 | 0 | 0 | 1 | 1 | 1 | 2 | 2 | 2 | 2 | 2 | 3 |
| 3750 | 0 | 0 | 1 | 1 | 1 | 2 | 2 | 2 | 2 | 2 | 3 |
| 4000 | 0 | 0 | 1 | 1 | 1 | 2 | 2 | 2 | 2 | 2 | 3 |
| 4500 | 0 | 0 | 1 | 1 | 1 | 2 | 2 | 2 | 2 | 2 | 3 |
| 5000 | 0 | 0 | 1 | 1 | 1 | 2 | 2 | 2 | 2 | 2 | 3 |
| 5500 | 0 | 0 | 1 | 1 | 1 | 2 | 2 | 2 | 2 | 2 | 3 |
| 6000 | 0 | 0 | 1 | 3 | 3 | 3 | 3 | 3 | 3 | 3 | 3 |
| 6500 | 0 | 0 | 1 | 3 | 3 | 3 | 3 | 3 | 3 | 3 | 3 |
| 7000 | 0 | 0 | 1 | 3 | 3 | 3 | 3 | 3 | 3 | 3 | 3 |
| 7500 | 0 | 0 | 1 | 3 | 3 | 3 | 3 | 3 | 3 | 3 | 3 |
| 8000 | 0 | 0 | 1 | 3 | 3 | 3 | 3 | 3 | 3 | 3 | 3 |
| 8500 | 0 | 0 | 1 | 3 | 3 | 3 | 3 | 3 | 3 | 3 | 3 |

SECONDARY AIR SUPPLY SYSTEM AND VEHICLE

BACKGROUND OF THE INVENTION

1. Field of the Invention

The present invention relates to a secondary air supply system that supplies secondary air to an engine and a vehicle including the same.

2. Description of the Background Art

Conventionally, a technique for supplying secondary air to an exhaust pipe has been developed in order to purify an exhaust gas exhausted from a vehicle (see JP 2006-183513 A, for example).

In a secondary air introduction device described in JP 2006-183513 A, a first tube and a second tube are connected to the exhaust pipe. Secondary air is supplied to the exhaust pipe through the first and second tubes. This causes the exhaust gas in the exhaust pipe to be oxidized, resulting in purification of the exhaust gas.

In a vehicle such as a motorcycle, purification of the exhaust gas using a catalyst device is performed in addition to the purification of the exhaust gas using the secondary air. When an amount of the secondary air supplied to the exhaust pipe increases, however, an amount of oxygen flowing into the catalyst device increases, resulting in lower purification efficiency of the catalyst device. Therefore, it is difficult to effectively improve the efficiency of purifying the exhaust gas simply by providing the foregoing secondary air introduction device and catalyst device in the exhaust pipe.

SUMMARY OF THE INVENTION

In order to overcome the problems described above, preferred embodiments of the present invention provide a secondary air supply system capable of effectively improving the efficiency of purifying an exhaust gas and a vehicle including the same.

According to a preferred embodiment of the present invention, a secondary air supply system that supplies secondary air to an exhaust passage of an engine includes a supply source of the secondary air, first and second paths through which the secondary air is supplied from the supply source to the exhaust passage, an engine state determination device that determines a state of the engine, and a path switching device that selectively switches the first and second paths to a communicated state or a shut-off state, respectively, based on the state of the engine determined by the engine state determination device.

According to the secondary air supply system, the secondary air is supplied to the exhaust passage from the supply source through the first and second paths. This promotes oxidation reaction of unburned components included in the exhaust gas of the engine. As a result, the unburned components included in the exhaust gas are removed.

Here, purification by the secondary air and purification by a catalyst device must be appropriately combined in order to efficiently purify the exhaust gas. That is, when the secondary air is supplied to the exhaust passage so that the air-fuel ratio in the exhaust passage is lean, the unburned components (HC and CO) in the exhaust gas can be efficiently removed, but the efficiency of purifying nitrogen oxide (NOx) by the catalyst device is reduced. In addition, when the secondary air is supplied to the exhaust passage so that the air-fuel ratio in the exhaust passage is a theoretical air-fuel ratio, the efficiency of purifying the exhaust gas by the catalyst device is improved, but the amount of the unburned components removed by the secondary air decreases.

Therefore, the first and second paths are selectively switched to the communicated state or the shut-off state, respectively, by the path switching device based on the state of the engine determined by the engine state determination device in the secondary air supply system.

In this case, when the state of the engine is a state where the amount of the unburned components removed by the secondary air should be increased, the first and second paths are brought into the communicated state to allow the amount of the secondary air supply to increase. This sufficiently promotes the oxidation reaction of the unburned components in the exhaust gas. As a result, the unburned components in the exhaust gas are efficiently removed.

When the state of the engine is a state where the efficiency of purifying the exhaust gas by the catalyst device should be improved, at least one of the first and second paths is brought into the shut-off state to allow the amount of the secondary air supply to decrease. This causes the air-fuel ratio in the exhaust passage to be close to the theoretical air-fuel ratio, so that the efficiency of purifying the exhaust gas by the catalyst device is improved.

As described above, the amount of the secondary air to be supplied to the exhaust passage can be appropriately adjusted based on the state of the engine determined by the engine state determination device according to the secondary air supply system. Thus, the purification of the exhaust gas by the secondary air and the purification of the exhaust gas by the catalyst device can be appropriately combined. As a result, the efficiency of purifying the exhaust gas can be effectively improved.

The state of the engine may include a first state and a second state set in advance based on an amount of nitrogen oxide exhausted from a combustion chamber of the engine, and the amount of the nitrogen oxide in the first state may be smaller than the amount of the nitrogen oxide in the second state. The path switching device may bring the first and second paths into the communicated state when the state of the engine is determined to be the first state by the engine state determination device, and bring either one of the first and second paths into the communicated state when the state of the engine is determined to be the second state by the engine state determination device.

According to the secondary air supply system, when the state of the engine is the first state, that is, when the amount of the nitrogen oxide exhausted from the combustion chamber is small, the first and second paths are brought into the communicated state by the path switching device. In this case, since a sufficient amount of secondary air is supplied to the exhaust passage, the unburned components included in the exhaust gas can be efficiently removed. In addition, since the amount of the nitrogen oxide included in the exhaust gas is small, the nitrogen oxide can be sufficiently prevented from being exhausted to the outside even though the purification efficiency of the catalyst device is decreased.

Moreover, when the state of the engine is the second state, that is, when the amount of the nitrogen oxide exhausted from the combustion chamber is large, either one of the first and second paths is brought into the shut-off state by the path switching device. In this case, the amount of the secondary air supplied to the exhaust passage decreases, and the air-fuel ratio in the exhaust passage is close to the theoretical air-fuel ratio. This improves the purification efficiency of the catalyst device so that the nitrogen oxide included in the exhaust gas can be reliably removed.

As a result of the above-described features, the efficiency of purifying the exhaust gas can be sufficiently improved.

The secondary air supply system may further include a throttle valve that adjusts an intake air amount of the engine, wherein the engine state determination device may determine the first state and the second state based on a rotational speed of the engine and an opening of the throttle valve.

In this case, the first and second states can be easily determined based on the rotational speed of the engine and the opening of the throttle valve. This easily improves the efficiency of purifying the exhaust gas.

The secondary air supply system may further include a storage device that stores information indicating a relationship among the rotational speed of the engine, the opening of the throttle valve, the first state, and the second state.

In this case, the first state and the second state can be reliably determined based on the information stored in the storage device. This reliably improves the efficiency of purifying the exhaust gas.

The engine state determination device may determine the first state and the second state based on a rotational speed of the engine and a pressure in an intake port of the engine. In this case, the first state and the second state can be easily determined. This easily improves the efficiency of purifying the exhaust gas.

The secondary air supply system may further include a first detector that detects the amount of the nitrogen oxide exhausted from the combustion chamber of the engine, wherein the engine state determination device may determine the first state and the second state based on the amount of the nitrogen oxide detected by the first detector.

In this case, the first state and the second state can be reliably determined based on the result of detection by the first detector. This reliably improves the efficiency of purifying the exhaust gas.

The state of the engine may further include a third state set in advance based on a load applied on the engine, the load in the third state is higher than a load in the first state and the second state, and the path switching device may bring the first and second paths into the shut-off state when the state of the engine is determined to be the third state by the engine state determination device.

When the state of the engine is a high load state, the temperature of the exhaust gas increases. Therefore, when the state of the engine is the third state, that is, the high load state, the first and second paths are brought into the shut-off state by the path switching device in the secondary air supply system. This causes the supply of the secondary air to the exhaust passage to be shut off, so that the oxidation of the unburned components in the exhaust gas is suppressed.

In this case, since the increase in the temperature of the exhaust gas due to the oxidation reaction of the unburned components is prevented, the excessive increase in the temperature of the exhaust gas is prevented. Thus, the excessive increase in the temperature of the catalyst device is prevented even when the engine is in the high load state. As a result, a lower purification efficiency of the catalyst device and degradation of the catalyst device are prevented.

The secondary air supply system may further include a fuel supply device that supplies fuel to the engine so that the air-fuel ratio in the combustion chamber of the engine is a predetermined value, and a second detector that detects the oxygen concentration in the exhaust passage, wherein the fuel supply device may correct, when the engine is determined to be in the second state by the engine state determination device, an amount of the fuel supplied to the engine based on the oxygen concentration detected by the second detector so that the air-fuel ratio in the exhaust passage is substantially a theoretical air-fuel ratio.

When the state of the engine is the second state, the amount of fuel to be supplied to the engine is corrected based on the oxygen concentration detected by the second detector in the secondary air supply system. This causes the air-fuel ratio in the exhaust passage to be substantially the theoretical air-fuel ratio, so that the purification efficiency of the catalyst device is reliably improved.

The path switching device may bring, when the state of the engine is determined to be the second state by the engine state determination device, either one of the first and second paths into the communicated state so that an amount of the correction by the fuel supply device is reduced.

In this case, since the amount of the correction to the amount of fuel to be supplied by the fuel supply device can be reduced, the amount of the fuel supplied to the engine can be increased/decreased less. This stabilizes the output of the engine, improves drivability of the vehicle, and improves fuel efficiency.

At least one of the first and second paths may be connected to the exhaust passage at a position within about 50 mm, for example, from the combustion chamber of the engine.

In this case, at least one of the first and second paths is arranged in the vicinity of the combustion chamber, thus allowing a portion of the secondary air supplied from the first or second path to the exhaust passage to flow into the combustion chamber. This stabilizes combustion of an air-fuel mixture in the combustion chamber and stabilizes the output of the engine.

The air-fuel ratio in the exhaust passage may be set to not less than about 15 by the secondary air supplied through the first and second paths.

In this case, the first and second paths are brought into the communicated state, so that the air-fuel ratio in the exhaust passage is set to not less than about 15, for example. This reliably promotes the oxidation reaction of the unburned components in the exhaust gas. As a result, the unburned components in the exhaust gas can be more reliably removed.

According to another preferred embodiment of the present invention, a vehicle includes an engine, a drive wheel, a transmission mechanism that transmits power generated by the engine to the drive wheel, an exhaust passage through which an exhaust gas exhausted from the engine flows, a catalyst device that is provided in the exhaust passage and purifies the exhaust gas exhausted from the engine, and a secondary air supply system that supplies secondary air to the exhaust passage, wherein the secondary air supply system includes a supply source of the secondary air, first and second paths through which the secondary air is supplied from the supply source to the exhaust passage, an engine state determination device that determines a state of the engine, and a path switching device that selectively switches the first and second paths to a communicated state or a shut-off state, respectively, based on the state of the engine determined by the engine state determination device.

In the vehicle, the power generated by the engine is transmitted to the drive wheel through the transmission mechanism. This causes the vehicle to drive. In addition, the exhaust gas exhausted from the engine is purified by the catalyst device provided in the exhaust passage.

Moreover, the secondary air is supplied from the supply source to the exhaust passage through the first and second paths according to the secondary air supply system of the vehicle. This promotes oxidation reaction of unburned components included in the exhaust gas of the engine. As a result, the unburned components included in the exhaust gas are removed.

Here, purification by the secondary air and purification by the catalyst device must be appropriately combined in order to efficiently purify the exhaust gas. That is, when the secondary air is supplied to the exhaust passage so that the air-fuel ratio in the exhaust passage is lean, the unburned components (HC and CO) in the exhaust gas can be efficiently removed, but the efficiency of purifying the nitrogen oxide (NOx) by the catalyst device is reduced. In addition, when the secondary air is supplied to the exhaust passage so that the air-fuel ratio in the exhaust passage is a theoretical air-fuel ratio, the efficiency of purifying the exhaust gas by the catalyst device is improved, but the amount of the unburned components removed by the secondary air decreases.

Therefore, the first and second paths are selectively switched to the communicated state or the shut-off state, respectively, by the path switching device based on the state of the engine determined by the engine state determination device in the secondary air supply system.

In this case, when the state of the engine is a state where the amount of the unburned components removed by the secondary air should be increased, the first and second paths are brought into the communicated state to allow the amount of the secondary air supply to increase. This sufficiently promotes the oxidation reaction of the unburned components in the exhaust gas. As a result, the unburned components in the exhaust gas are efficiently removed.

When the state of the engine is a state where the efficiency of purifying the exhaust gas by the catalyst device should be improved, at least one of the first and second paths is brought into the shut-off state to allow the amount of the secondary air supply to decrease. This causes the air-fuel ratio in the exhaust passage to be close to the theoretical air-fuel ratio so that the efficiency of purifying the exhaust gas by the catalyst device is improved.

As described above, the amount of the secondary air to be supplied to the exhaust passage can be appropriately adjusted based on the state of the engine determined by the engine state determination device according to the secondary air supply system. Thus, the purification of the exhaust gas by the secondary air and the purification of the exhaust gas by the catalyst device can be appropriately combined. As a result, the efficiency of purifying the exhaust gas can be effectively improved.

According to preferred embodiments of the present invention, an appropriate amount of the secondary air is supplied to the exhaust passage depending on the state of the engine. Thus, the purification of the exhaust gas by the secondary air and the purification of the exhaust gas by the catalyst device can be appropriately combined. As a result, the efficiency of purifying the exhaust gas can be effectively improved.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 9 is diagram showing a relationship among an engine speed, a throttle opening, a first shut-off valve, and a second shut-off valve.

DETAILED DESCRIPTION OF PREFERRED EMBODIMENTS

Figure 1:
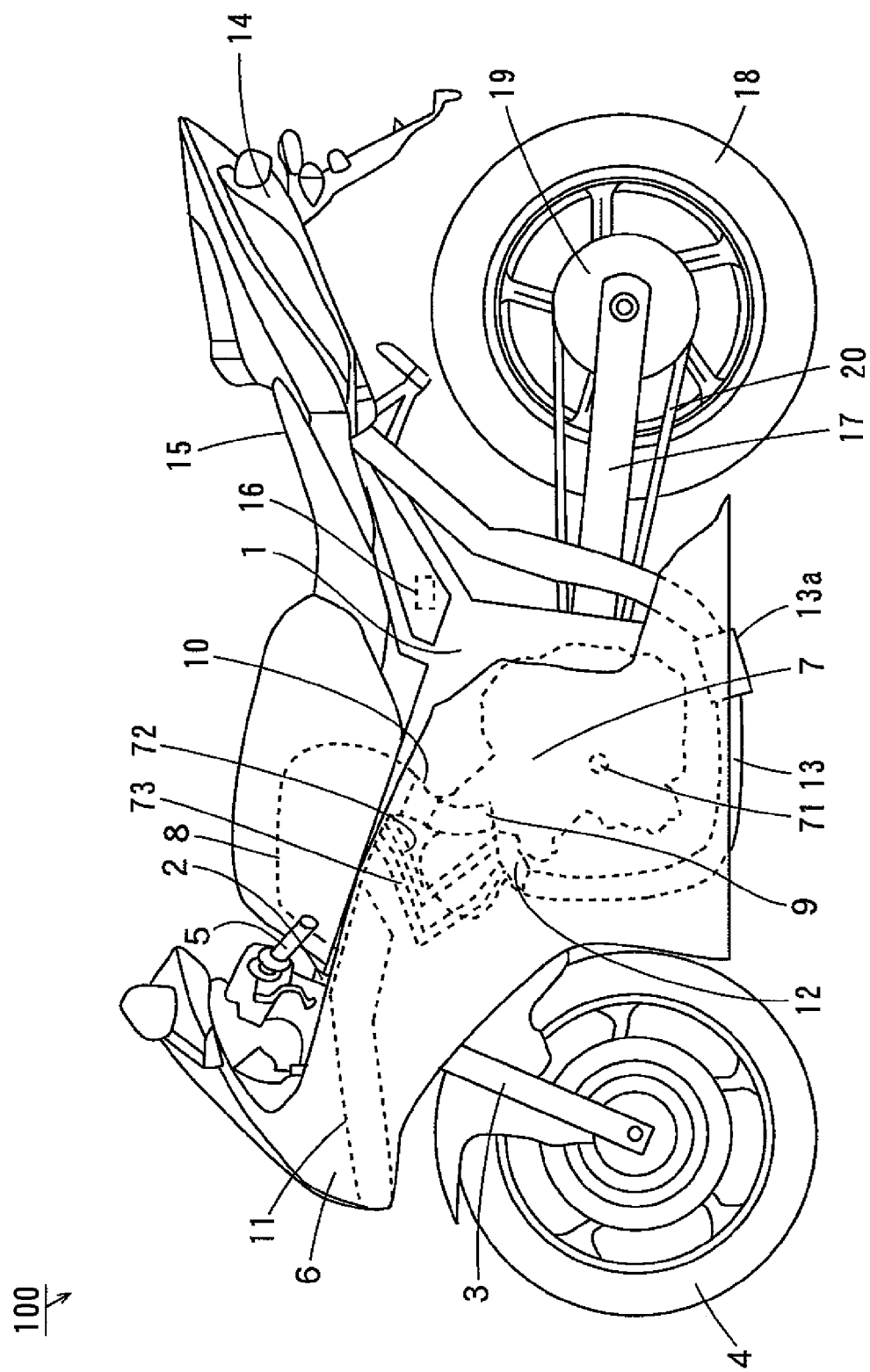
FIG. 1 is an external side view showing a motorcycle including a secondary air supply system according to a first preferred embodiment of the present invention.

Hereinafter, description is made of a secondary air supply system and a vehicle including the same according to preferred embodiments of the present invention while referring to the drawings. Note that description is made of a motorcycle only as an example of the vehicle in the following description.

First Preferred Embodiment (1) Configuration of Motorcycle

FIG. 1 is an external side view showing the motorcycle including the secondary air supply system according to a first preferred embodiment of the present invention.

As shown in FIG. 1, the motorcycle 100 includes a main frame 1. The main frame 1 is provided with a head pipe 2 at its front end. The head pipe 2 is provided with a front fork 3 that can turn. A front wheel 4 is rotatably supported at a lower end of the front fork 3. A handle 5 is attached to an upper end of the head pipe 2.

A cowling 6 is arranged so as to cover a front and sides of the main frame 1. An engine 7 is provided at the approximate center of the main frame 1. An air cleaner box 8 is provided above the engine 7. A throttle body 10 is arranged so as to connect the air cleaner box 8 and an intake port 9 of the engine 7.

An intake passage 11 that communicates the inside of the air cleaner box 8 and the outside is arranged so as to be covered with the cowling 6 at the front of the motorcycle 100. An end of the intake passage 11 opens at a front surface of the cowling 6. Thus, outside air is taken into the engine 7 through the intake passage 11, the air cleaner box 8, the throttle body 10, and the intake port 9.

An end of an exhaust pipe 13 is connected to an exhaust port 12 of the engine 7. A catalyst device 13a for purifying an exhaust gas exhausted from the engine 7 is inserted in the exhaust pipe 13. The catalyst device 13a is preferably composed of a three-way catalyst, for example. A muffler device 14 is connected to the other end of the exhaust pipe 13. The exhaust gas in the engine 7 is exhausted to the outside through the exhaust port 12, the exhaust pipe 13, and the muffler device 14.

A seat 15 is provided above the engine 7. An ECU (Electronic Control Unit) 16 that controls operations of each component of the motorcycle 100 is provided below the seat 15. Details of the ECU 16 will be described below.

A rear arm 17 is connected to the main frame 1 so as to extend toward the back of the engine 7. The rear arm 17 holds a rear wheel 18 and a rear wheel driven sprocket 19 in a rotatable manner. A torque of a crankshaft 71 of the engine 7 is transmitted to the rear wheel driven sprocket 19 through a transmission (not shown) and a chain 20. This causes the rear wheel 18 to rotate.

A first air supply pipe 72 and a second air supply pipe 73 are provided at the approximate center of the main frame 1. One end of the first air supply pipe 72 is connected to the exhaust port 12, and the other end thereof is connected to the air cleaner box 8. Similarly, one end of the second air supply pipe 73 is connected to the exhaust port 12, and the other end thereof is connected to the air cleaner box 8. Details of the first and second air supply pipes 72, 73 will be described below.

(2) Configuration of the Secondary Air Supply System

Figure 2:
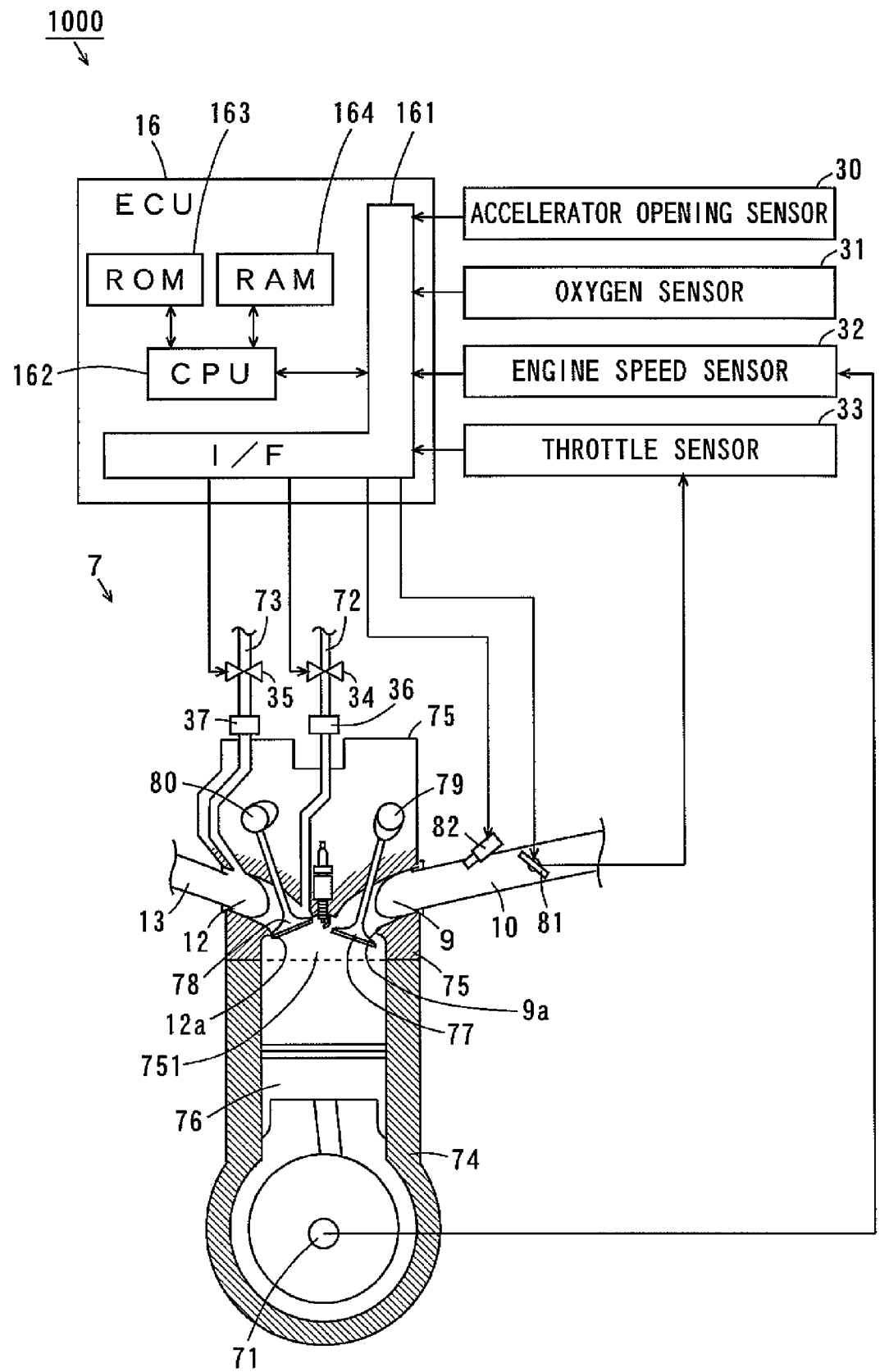
FIG. 2 is a schematic view showing the secondary air supply system.
Figure 3:
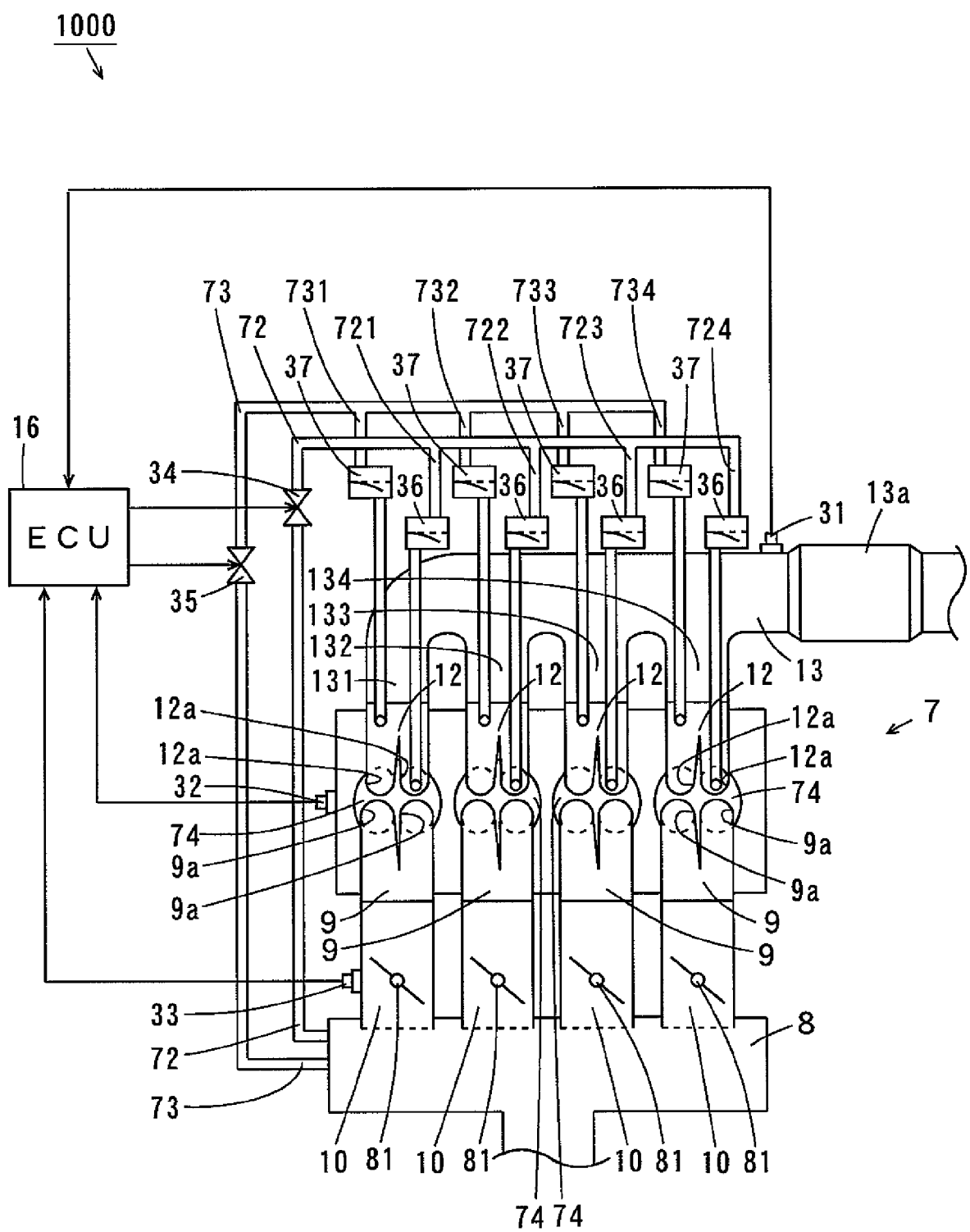
FIG. 3 is a schematic view showing the secondary air supply system.

FIGS. 2 and 3 are schematic views showing the secondary air supply system according to the present preferred embodiment. Note that FIG. 2 shows a vertical sectional view of the engine 7, and FIG. 3 shows a top view of the engine 7.

As shown in FIGS. 2 and 3, the secondary air supply system 1000 according to the present preferred embodiment includes the engine 7, the ECU 16, an accelerator opening sensor 30, an oxygen sensor 31, an engine speed sensor 32, a throttle sensor 33, a first shut-off valve 34, a second shut-off valve 35, a throttle valve 81, and an injector 82.

As shown in FIG. 2, the engine 7 includes a cylinder 74 and a cylinder head 75. A piston 76 is arranged so as to move up and down in the cylinder 74. The piston 76 is coupled to the crankshaft 71 by a connecting rod and a crank (not shown).

A combustion chamber 751 for burning an air-fuel mixture is formed in the cylinder head 75. The intake port 9 and the exhaust port 12 are formed in the cylinder head 75 so as to communicate the combustion chamber 751 and the outside of the cylinder head 75.

An intake valve 77 is provided at a downstream open end 9a of the intake port 9, and an exhaust valve 78 is provided at an upstream open end 12a of the exhaust port 12. An intake valve driving device 79 for driving the intake valve 77 and an exhaust valve driving device 80 for driving the exhaust valve 78 are provided in the cylinder head 75. Note that one cam of the intake valve driving device 79 and one cam of the exhaust valve driving device 80 are shown in FIG. 2. The throttle valve 81 and the injector 82 are provided in the throttle body 10.

As shown in FIG. 3, the engine 7 includes four cylinders 74. The intake port 9, the exhaust port 12, the throttle valve 81, and the injector 82 (see FIG. 2) are provided for each cylinder 74. Each of the intake ports 9 on the cylinder 74 side branches into two passages. Similarly, each of the exhaust ports 12 on the cylinder 74 side branches into two passages. Thus, each of the intake ports 9 has two open ends 9a, and each of the exhaust ports 12 has two open ends 12a. Two intake valves 77 and two exhaust valves 78 of FIG. 2 are provided for each cylinder 74.

As shown in FIG. 3, the exhaust pipe 13 on the upstream side branches into four passages 131 to 134. The passages 131 to 134 are connected to the exhaust ports 12, respectively. First ends of the first air supply pipe 72 and the second air supply pipe 73 are connected to the air cleaner box 8, respectively. The other end of the first air supply pipe 72 branches into four passages 721 to 724. Similarly, the other end of the second air supply pipe 73 branches into four passages 731 to 734.

The passages 721 to 724 are connected to the vicinity of first open ends 12a of the exhaust ports 12, respectively, and the passages 731 to 734 are connected to the exhaust ports 12 on the exhaust pipe 13 side, respectively. Note that the passages 721 to 724 are preferably connected to the exhaust ports 12, respectively, at positions within about 50 mm from the open ends 12a. The passages 731 to 734 are preferably connected to the exhaust ports 12, respectively, at positions of not less than about 50 mm away from the connection portions of the passages 721 to 724 and the exhaust ports 12.

In the present preferred embodiment, air in the air cleaner box 8 is supplied to the exhaust ports 12 through the first air supply pipe 72 and the second air supply pipe 73. Note that the air supplied from the air cleaner box 8 to the exhaust ports 12 is referred to as secondary air in the following description.

A check valve 36 is provided in each of the passages 721 to 724 and a check valve 37 is provided in each of the passages 731 to 734. This prevents backflow of the exhaust gas from the exhaust ports 12 to the air cleaner box 8. In addition, the first shut-off valve 34 is provided upstream of the passages 721 to 724 in the first air supply pipe 72, and the second shut-off valve 35 is provided upstream of the passages 731 to 734 in the second air supply pipe 73.

The accelerator opening sensor 30 (FIG. 2) is positioned in the vicinity of the throttle valve 81 of the throttle body 10, and detects an operation amount (herein after referred to as an accelerator opening) of an accelerator grip (not shown) by a driver. The oxygen sensor 31 is provided in the exhaust pipe 13, and detects the oxygen concentration in the exhaust pipe 13. As shown in FIG. 3, the oxygen sensor 31 is provided between the passages 131 to 134 and the catalyst device 13a.

The engine speed sensor 32 (FIGS. 2 and 3) detects a rotational speed (herein after referred to as an engine speed) of the engine 7 (the crankshaft 71). The throttle sensor 33 detects the opening of the throttle valves 81 (herein after referred to as a throttle opening).

The ECU 16 preferably includes an I/F (interface) 161, a CPU (Central Processing Unit) 162, a ROM (Read Only Memory) 163, and a RAM (Random Access Memory) 164, for example.

The accelerator opening detected by the accelerator opening sensor 30 (FIG. 2), the oxygen concentration detected by the oxygen sensor 31, the engine speed detected by the engine speed sensor 32, and the throttle opening detected by the throttle sensor 33 are supplied to the CPU 162 through the I/F 161. A control program of the CPU 162 is stored in the ROM 163. Various kinds of data related to the secondary air supply system 1000 are stored in the RAM 164. Moreover, the RAM 164 functions as a processing area of the CPU 162.

The CPU 162 controls opening/closing of the throttle valves 81 based on a detected value of the accelerator opening sensor 30. Note that data indicating a relationship between the accelerator opening and the throttle opening is stored in the RAM 164 in the present preferred embodiment. The CPU 162 controls the throttle valves 81 based on the detected value of the accelerator opening sensor 30 and the data stored in the RAM 164.

In the present preferred embodiment, the accelerator grip (not shown) and the throttle valves 81 are mechanically coupled to one another. In this case, since the opening/closing of the throttle valves 81 can be mechanically restricted, an upper limit value of the throttle opening depending on an operation amount of the accelerator grip can be set, for example.

Moreover, the CPU 162 adjusts an air-fuel ratio of the air-fuel mixture in the combustion chamber 751 by controlling the injectors 82. In the present preferred embodiment, the air-fuel ratio of the air-fuel mixture in the combustion chamber 751 is set on a rich side by the CPU 162, for example.

Furthermore, the CPU 162 controls opening/closing of each of the first shut-off valve 34 and the second shut-off valve 35 based on the detected values of the engine speed sensor 32 and the throttle sensor 33. Accordingly, the amount of the secondary air supplied from the air cleaner box 8 to the exhaust ports 12 is adjusted.

In the present preferred embodiment, information indicating a relationship among the engine speed, the throttle opening, an opening/closing state of the first shut-off valve 34, and an opening/closing state of the second shut-off valve 35 is stored in the RAM 164. The CPU 162 controls the first shut-off valve 34 and the second shut-off valve 35 based on the detected value of the engine speed sensor 32, the detected value of the throttle sensor 33, and the information stored in the RAM 164. In addition, the CPU 162 corrects an amount of fuel injected by the injectors 82 based on the detected value of the oxygen sensor 31. Details of the control operation of the CPU 162 will be described below.

(3) The Amount of the Secondary Air Supply to the Exhaust Ports

Figure 4:
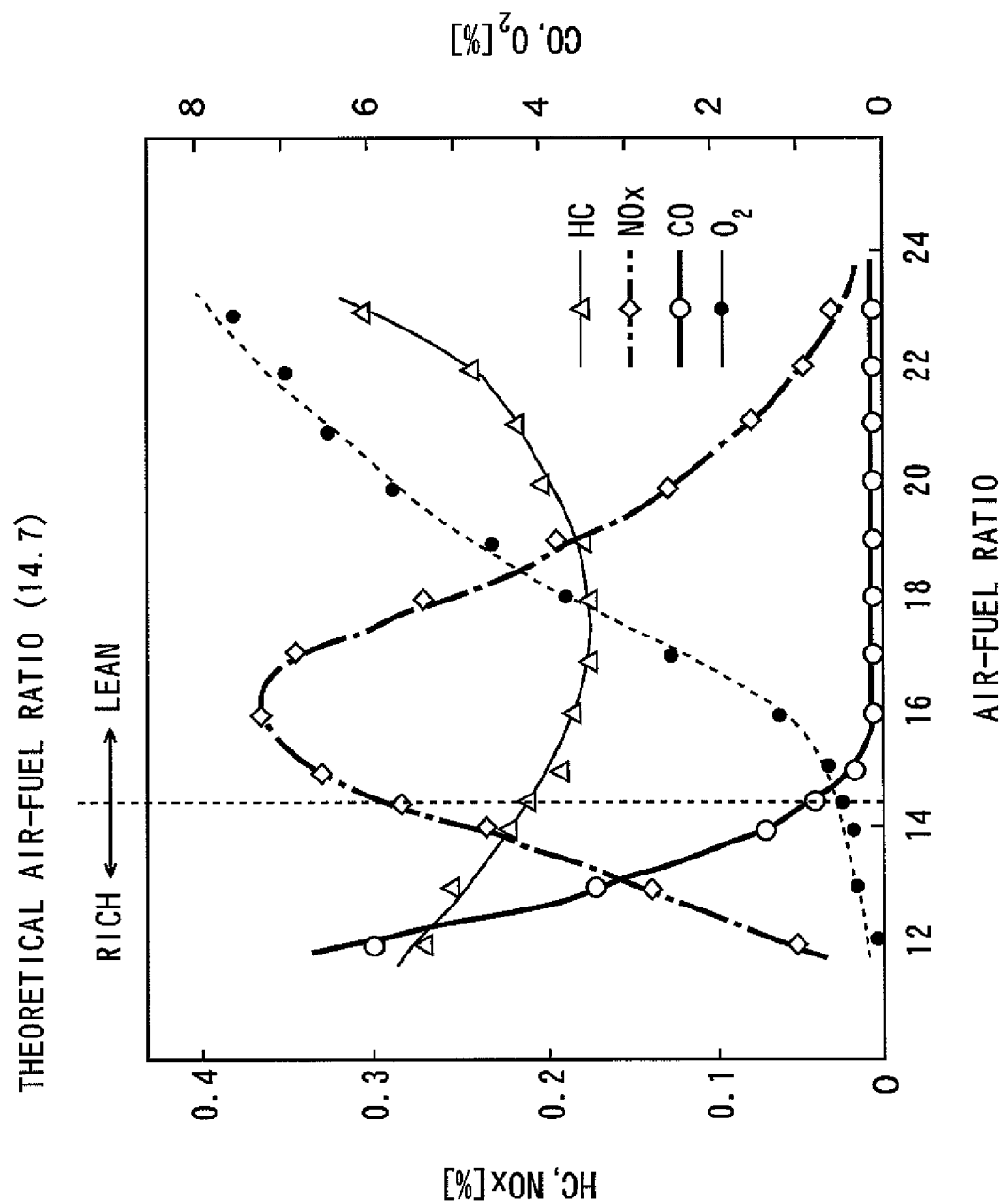
FIG. 4 is a diagram showing examples of respective amounts of HC, NOx, CO and $O_2$ included in an exhaust gas.

FIG. 4 is a diagram showing examples of respective amounts (contents) of HC (hydrocarbon), NOx (nitrogen oxide), CO (carbon monoxide) and $O_2$ (oxygen) included in the exhaust gas of a general engine. Note that in FIG. 4, the ordinate indicates the respective amounts of HC, NOx, CO and $O_2$ in the exhaust gas, and the abscissa indicates the air-fuel ratio (A/F) in the combustion chamber of the engine. In FIG. 4, "Δ" indicates the amount of HC, "◊" indicates the amount of NOx, "○" indicates the amount of CO, and "●" indicates the amount of $O_2$.

Generally, an amount of fuel is controlled so that the air-fuel ratio in the combustion chamber of the engine is a theoretical air-fuel ratio (A/F≈14.7) in a four-wheeled motor vehicle. In this case, the amounts of HC and CO in the exhaust gas tend to be less than the amount of NOx as shown in FIG. 4.

On the other hand, in a motorcycle, the air-fuel ratio of the air-fuel mixture in the combustion chamber is set on the rich side in some cases in order to increase output of the engine and obtain satisfactory drivability. In this case, in the exhaust gas, the amounts of HC and CO increase while the amount of NOx decreases as shown in FIG. 4. Accordingly, it is important to efficiently remove HC and CO in the exhaust gas in order to efficiently purify the exhaust gas in the motorcycle.

Therefore, the secondary air is supplied from the air cleaner box 8 to the exhaust ports 12 in the motorcycle 100 according to the present preferred embodiment. The secondary air promotes oxidation of HC and CO in the exhaust gas. Accordingly, HC and CO are efficiently removed. Description will now be made of characteristics of purification of the exhaust gas by the secondary air that have been discovered by the inventors.

Figure 5:
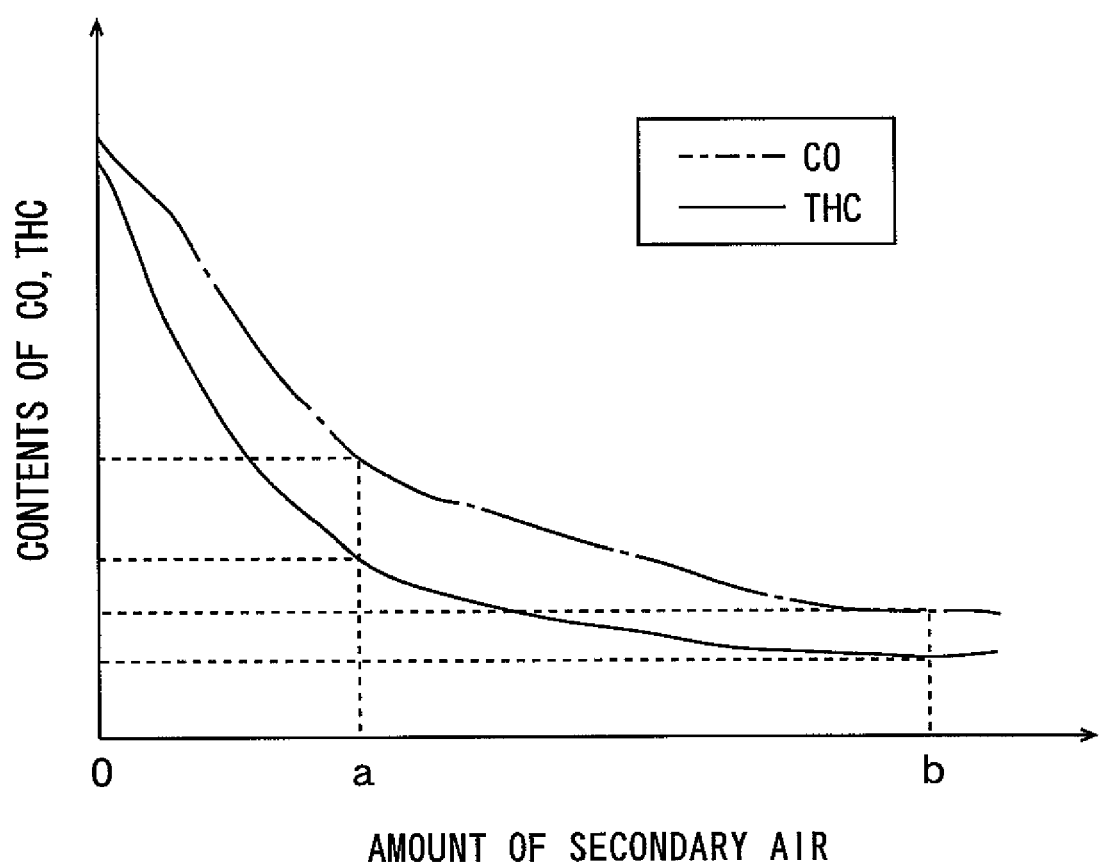
FIG. 5 is a diagram showing characteristics of purification of THC and CO by secondary air.

FIG. 5 is a diagram showing characteristics of purification of THC (total hydrocarbons) and CO by the secondary air. In FIG. 5, the ordinate indicates the amounts of THC and CO included in the exhaust gas, and the abscissa indicates the amount of the secondary air supplied to the exhaust ports 12. Note that "a" indicates the amount of the secondary air when the air-fuel ratio of the exhaust gas is the theoretical air-fuel ratio (A/F≈14.7), and "b" indicates the amount of the secondary air when the air-fuel ratio of the exhaust gas is 17. In FIG. 5, the one-dot and dash line indicates the amount of CO, and the solid line indicates the amount of THC. Note that FIG. 5 shows the purification characteristics when the air-fuel ratio of the air-fuel mixture in the combustion chamber 751 (FIG. 2) is set to about 13.

As shown in FIG. 5, the amounts of THC and CO included in the exhaust gas decrease with an increase in the amount of the secondary air supplied to the exhaust ports 12, and attain respective minimum amounts when the air-fuel ratio of the exhaust gas reaches not less than about 17. In this manner, CO and THC can be efficiently removed by sufficiently supplying the secondary air to the exhaust ports 12. In particular, it is found that CO and THC can be reliably removed by setting the air-fuel ratio of the exhaust gas to about 17.

When the air-fuel ratio of the exhaust gas is constantly set to about 17, however, the amount of oxygen flowing into the catalyst device 13a increases, lowering the efficiency of purifying the exhaust gas by the catalyst device 13a. Therefore, the inventors determined the amount of the secondary air supply to the exhaust ports 12 depending on the state of the engine 7 based on various types of simulations, experiments and other suitable methods. This enabled efficient purification of the exhaust gas of the engine 7 and improvement of the combustion efficiency (output) of the engine 7. Description will now be made in detail of the appropriate amount of the secondary air supply that was discovered by the inventors based on the various types of simulations, experiments and other suitable methods.

Figure 6:
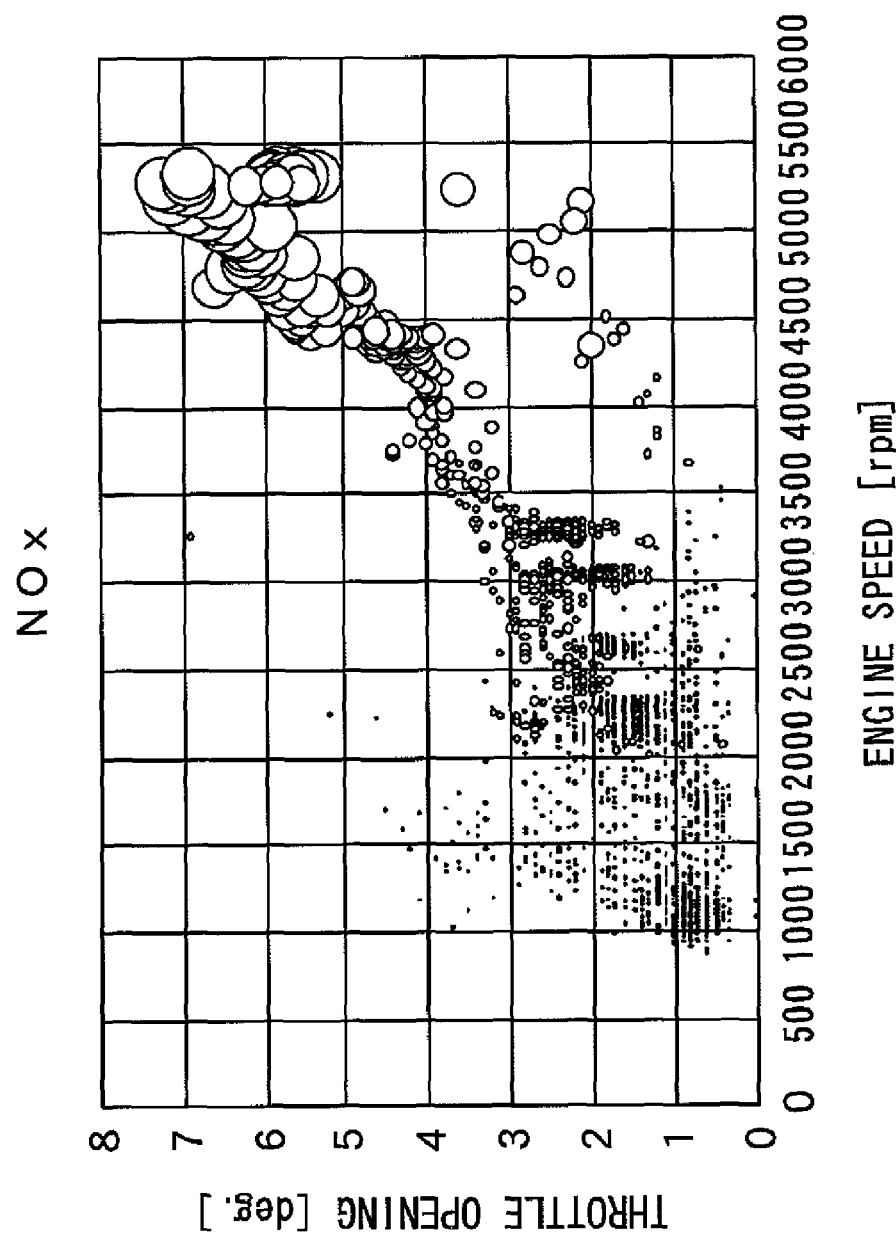
FIG. 6 is a diagram showing a test result based on an NEDC mode.
Figure 7:
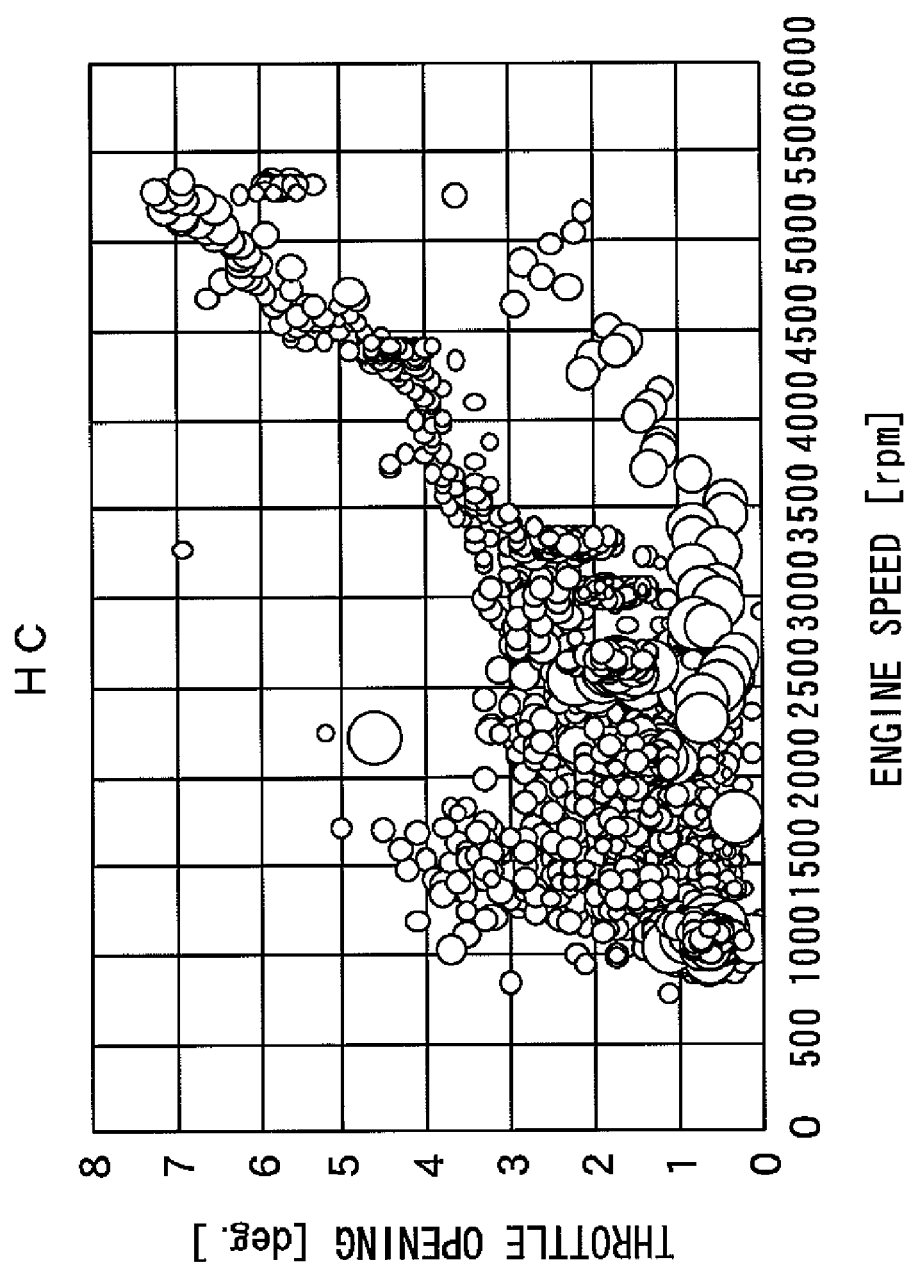
FIG. 7 is a diagram showing a test result based on the NEDC mode.
Figure 8:
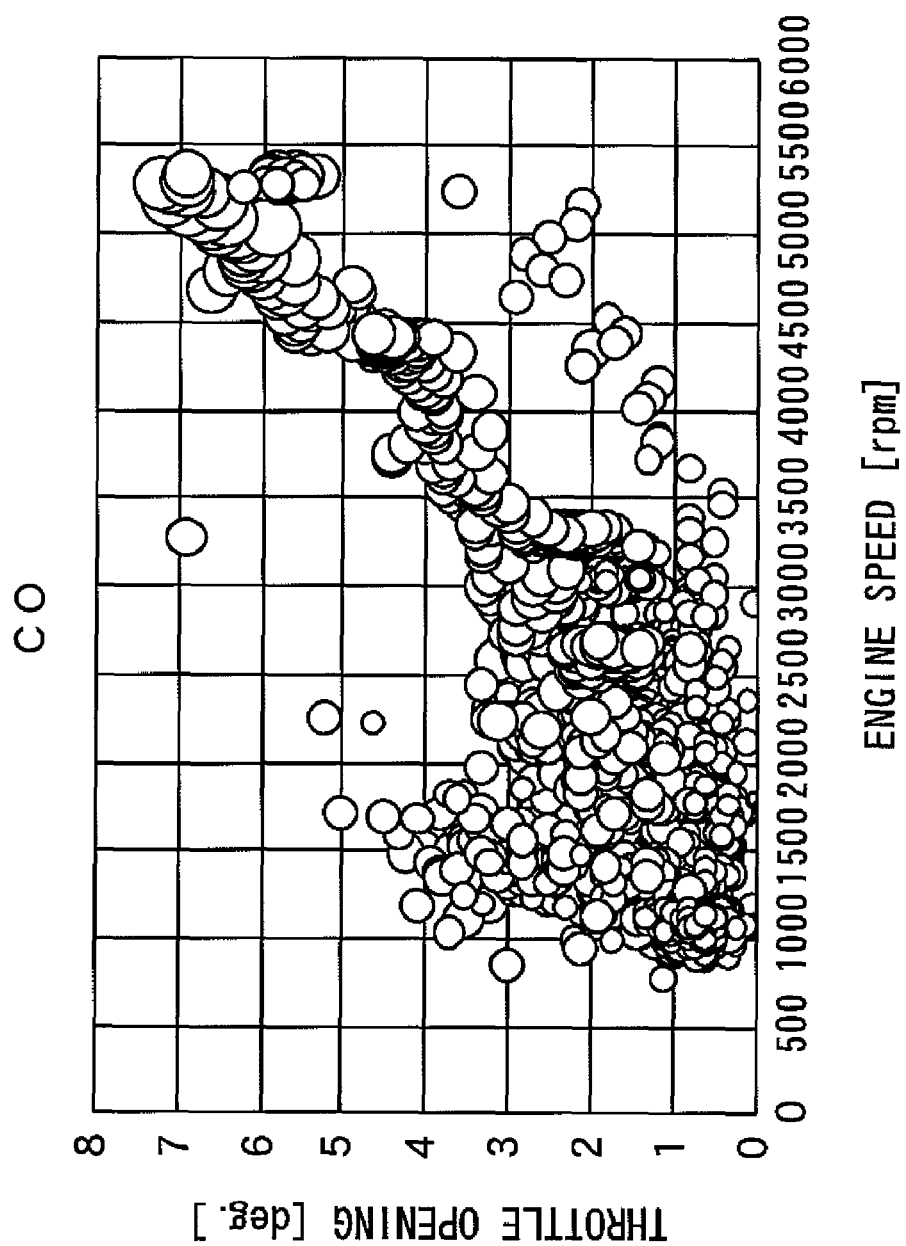
FIG. 8 is a diagram showing a test result based on the NEDC mode.

FIGS. 6 to 8 are diagrams showing test results based on an NEDC (New European Driving Cycle) mode. FIG. 6 shows a result of detection of NOx in the exhaust gas, FIG. 7 shows a result of detection of HC in the exhaust gas, and FIG. 8 shows a result of detection of CO in the exhaust gas. In each of FIGS. 6 to 8, the ordinate indicates the throttle opening and the abscissa indicates the engine speed. Note that in FIGS. 6 to 8, the results of detection of NOx, HC and CO are indicated by "○". The sizes of "○" shown in FIGS. 6 to 8 are proportional to the amount of detection of each component. For example, the amount of detection of NOx is large under a condition where the diameter of "○" is large in FIG. 6.

When the engine 7 is in a high speed and high load state, the amount of NOx exhausted from the engine 7 increases as shown in FIG. 6. When the engine 7 is in a low speed or low load state, the amount of HC exhausted from the engine 7 increases as shown in FIG. 7. The amount of CO exhausted from the engine 7 does not greatly vary as shown in FIG. 8. The inventors determined the amount of the secondary air supply depending on the state of the engine 7 based on the relationships shown in FIGS. 6 to 8. Details will be described below.

FIG. 9 is diagram showing a relationship among the engine speed, the throttle opening, the first shut-off valve 34, and the second shut-off valve 35. In FIG. 9, "0" indicates that both the first shut-off valve 34 and the second shut-off valve 35 are opened, "1" indicates that the first shut-off valve 34 is opened and the second shut-off valve 35 is closed, "2" indicates that the first shut-off valve 34 is closed and the second shut-off valve 35 is opened, and "3" indicates that both the first shut-off valve 34 and the second shut-off valve 35 are closed. Hereinafter, the relationship shown in FIG. 9 is referred to as selection information.

Note that the selection information shown in FIG. 9 is stored in the RAM 164 (or the ROM 163) (FIG. 2). The CPU 162 controls the first shut-off valve 34 and the second shut-off valve 35 based on the selection information shown in FIG. 9. While the selection information corresponding to 1600 rpm, 1800 rpm, . . . , 8000 rpm and 8500 rpm as well as 0.49 deg, 0.98 deg, . . . , 11.96 deg and 14.04 deg is shown in FIG. 9, the selection information corresponding to an arbitrary engine speed and an arbitrary throttle opening is stored in the RAM 164 (or the ROM 163) in practice. For example, the selection information includes data indicating that both the first shut-off valve 34 and the second shut-off valve 35 are opened when the engine speed is 1700 rpm and the throttle opening is 0.55 deg.

As shown in FIGS. 6 and 9, the CPU 162 controls both the first shut-off valve 34 and the second shut-off valve 35 to be opened in a region where the amount of NOx exhausted from the engine 7 is small. Thus, the secondary air flows into the exhaust ports 12 from the first air supply pipe 72 and the second air supply pipe 73.

In this case, the air-fuel ratio of the exhaust gas in the exhaust ports 12 and the exhaust pipe 13 is leaner than the theoretical air-fuel ratio. This promotes the oxidation of HC and CO in the exhaust gas, and HC and CO are efficiently removed. In addition, since the amount of NOx exhausted from the engine 7 is sufficiently small, NOx can be prevented from being exhausted from the exhaust pipe 13 to the outside. As a result, the exhaust gas can be efficiently purified.

Moreover, the oxidation of HC and CO is promoted, so that the temperature of the exhaust gas increases. This allows the temperature of the catalyst device 13a to increase. Accordingly, the catalyst device 13a can be activated in a short period of time even when the temperature of the catalyst device 13a is low (at the time of starting the engine 7, for example). This reliably purifies the exhaust gas.

In the present preferred embodiment, the sizes and the like of the first air supply pipe 72 and the second air supply pipe 73 are set so that the secondary air flowing from the first air supply pipe 72 and the second air supply pipe 73 into the exhaust ports 12 causes the air-fuel ratio of the exhaust gas to be about 17.

In addition, as shown in FIGS. 6 and 9, the CPU 162 controls at least one of the first shut-off valve 34 and the second shut-off valve 35 to be closed in a region where the amount of NOx exhausted from the engine 7 is large. Thus, the amount of the secondary air supplied to the exhaust ports 12 decreases.

Specifically, both the first shut-off valve 34 and the second shut-off valve 35 are closed by the CPU 162 in a region where the engine 7 is at high load. Accordingly, supply of the secondary air to the exhaust ports 12 is stopped.

Here, when the engine 7 is at high load, the temperature of the exhaust gas increases. Therefore, the supply of the secondary air to the exhaust ports 12 is stopped, so that the oxidation of HC and CO in the exhaust gas is suppressed in the present preferred embodiment. Accordingly, the increase in the temperature of the exhaust gas caused by the oxidation reaction of HC and CO can be prevented. As a result, an excessive increase in the temperature of the catalyst device 13a can be prevented, and lower purification efficiency of the catalyst device 13a and degradation of the catalyst device 13a can be prevented. Note that the first shut-off valve 34 and the second shut-off valve 35 are closed by the CPU 162 so that the temperature of the catalyst device 13a does not reach about 900° C. or more in the present preferred embodiment.

Moreover, the CPU 162 causes one of the first shut-off valve 34 and the second shut-off valve 35 to be opened and the amount of fuel injected by the injectors 82 to be adjusted in regions except for the high load region of the engine 7. Thus, the air-fuel ratio of the exhaust gas is set to the theoretical air-fuel ratio. As a result, the purification efficiency of the catalyst device 13a is maximized, and NOx, HC and CO in the exhaust gas can be efficiently removed.

Note that the first shut-off valve 34 or the second shut-off valve 35 is selectively opened based on the state of the engine 7 in order to cause the air-fuel ratio of the exhaust gas to be the theoretical air-fuel ratio in the present preferred embodiment. Hereinafter, description is made of a method of selecting the first shut-off valve 34 and the second shut-off valve 35.

Figure 10:
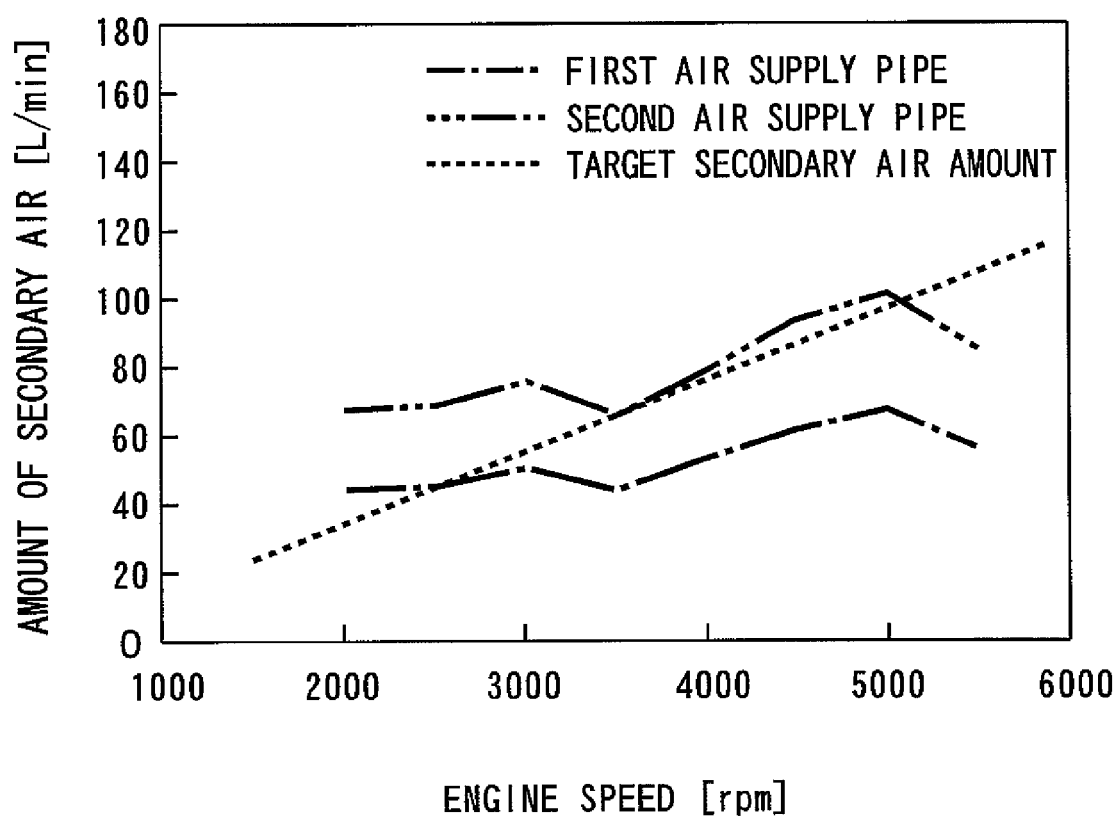
FIG. 10 is a diagram explaining an example of a method of selecting the first shut-off valve and the second shut-off valve.

FIG. 10 is a diagram explaining an example of the method of selecting the first shut-off valve 34 and the second shut-off valve 35. In FIG. 10, the ordinate indicates the amount of the secondary air, and the abscissa indicates the engine speed. The one-dot and dash line indicates an amount of the secondary air flowing from the first air supply pipe 72 to the exhaust ports 12, and the two-dots and dash line indicates an amount of the secondary air flowing from the second air supply pipe 73 to the exhaust ports 12. Moreover, the dotted line indicates an amount of the secondary air (herein after referred to as a target secondary air amount) necessary for causing the air-fuel ratio of the exhaust gas in the exhaust ports 12 (the exhaust pipe 13) to be the theoretical air-fuel ratio in a state where the air-fuel ratio of the air-fuel mixture in the combustion chamber 751 (FIG. 2) is 13. Note that the relationship shown in FIG. 10 varies depending on the throttle opening.

In the example shown in FIG. 10, a difference between the amount of the secondary air flowing from the first air supply pipe 72 to the exhaust ports 12 and the target secondary air amount is smaller than a difference between the amount of the secondary air flowing from the second air supply pipe 73 to the exhaust ports 12 and the target secondary air amount in a region where the engine speed is about 2000 rpm to about 3300 rpm. Therefore, the first shut-off valve 34 is opened in the region where the engine speed is about 2000 rpm to about 3300 rpm.

Meanwhile, the difference between the amount of the secondary air flowing from the second air supply pipe 73 to the exhaust ports 12 and the target secondary air amount is smaller than the difference between the amount of the secondary air flowing from the first air supply pipe 72 to the exhaust ports 12 and the target secondary air amount in a region where the engine speed is not less than about 3300 rpm. Therefore, the second shut-off valve 35 is opened in the region where the engine speed is not less than 3300 rpm.

As described above, the first shut-off valve 34 and the second shut-off valve 35 are selectively opened, so that the amount of the secondary air supplied to the exhaust ports 12 can be easily brought close to the target secondary air amount in the present preferred embodiment. This efficiently purifies the exhaust gas.

When the air-fuel ratio of the exhaust gas is set to the theoretical air-fuel ratio, the amount of fuel to be injected by the injectors 82 is adjusted by the CPU 162 in the present preferred embodiment. Specifically, the CPU 162 calculates the air-fuel ratio in the exhaust pipe 13 based on the oxygen concentration detected by the oxygen sensor 31. Then, the CPU 162 adjusts the amount of fuel to be injected by the injectors 82 based on the calculated difference between the air-fuel ratio and the theoretical air-fuel ratio.

Here, the first shut-off valve 34 and the second shut-off valve 35 are selectively opened so that the difference between the amount of the secondary air flowing from the first air supply pipe 72 or the second air supply pipe 73 to the exhaust ports 12 and the target secondary air amount is small in the present preferred embodiment. Accordingly, the air-fuel ratio of the exhaust gas can be easily brought close to the theoretical air-fuel ratio. In this case, since an amount of correction to the amount of injected fuel can be reduced, the output of the engine 7 can be easily stabilized. This enables comfortable driving of the motorcycle 100.

(4) The Control Operation of the CPU

Next, the control operation of the CPU 162 of adjusting the amount of the secondary air is described while referring to the drawings. Note that the state of the engine 7 when both the first shut-off valve 34 and the second shut-off valve 35 are opened (a region where the selection information of FIG. 9 is "0") is referred to as a lean state in the following description. In addition, the state of the engine 7 when only the first shut-off valve 34 is opened (a region where the selection information of FIG. 9 is "1") is referred to as a first selection state. The state of the engine 7 when only the second shut-off valve 35 is opened (a region where the selection information of FIG. 9 is "2") is referred to as a second selection state. The state of the engine 7 when both the first shut-off valve 34 and the second shut-off valve 35 are closed (a region where the selection information of FIG. 9 is "3") is referred to as a third selection state.

Figure 11:
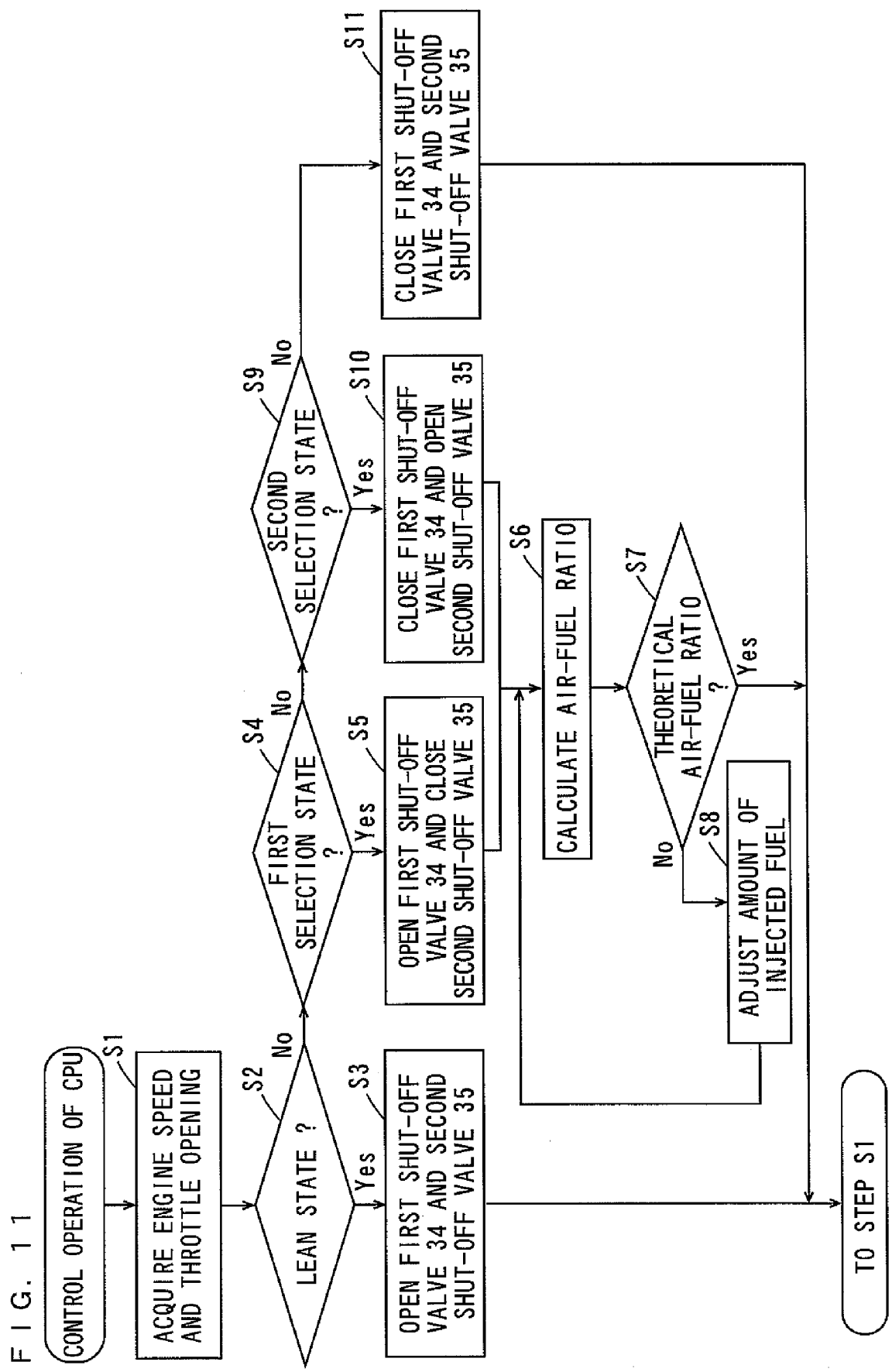
FIG. 11 is a flowchart showing a control operation of a CPU.

FIG. 11 is a flowchart showing the control operation of the CPU 162.

As shown in FIG. 11, the CPU 162 acquires the engine speed and the throttle opening from the engine speed sensor 32 (FIG. 2) and the throttle sensor 33 (FIG. 2) (Step S1).

Next, the CPU 162 determines whether or not the current state of the engine 7 is the lean state based on the engine speed and the throttle opening acquired in Step S1 and the selection information (see FIG. 9) stored in the RAM 164 (Step S2). When the engine 7 is in the lean state, the CPU 162 opens the first shut-off valve 34 and the second shut-off valve 35 (Step S3). After that, the CPU 162 returns to the process of Step S1.

When the engine 7 is not in the lean state in Step S2, the CPU 162 determines whether or not the current state of the engine 7 is the first selection state based on the engine speed and the throttle opening acquired in Step S1 and the selection information stored in the RAM 164 (Step S4). When the engine 7 is in the first selection state, the CPU 162 opens the first shut-off valve 34 and closes the second shut-off valve 35 (Step S5).

Next, the CPU 162 calculates the air-fuel ratio of the exhaust gas based on the oxygen concentration detected by the oxygen sensor 31 (FIG. 2) (Step S6). The CPU 162 subsequently determines whether or not the air-fuel ratio of the exhaust gas calculated in Step S6 is the theoretical air-fuel ratio (Step S7). When the air-fuel ratio of the exhaust gas is the theoretical air-fuel ratio, the CPU 162 returns to the process of Step S1 without adjusting the amount of fuel to be injected by the injectors 82. Note that in Step S7, the air-fuel ratio is determined to be the theoretical air-fuel ratio when the air-fuel ratio of the exhaust gas is a value within a predetermined range (A/F=14.2 to 14.9, for example) including the theoretical air-fuel ratio.

When the air-fuel ratio of the exhaust gas is not the theoretical air-fuel ratio in Step S7, the CPU 162 adjusts the amount of fuel to be injected by the injectors 82 (Step S8). After that, the CPU 162 returns to the process of Step S6. The CPU 162 repeats the processes of Step S6 to Step S8 until the air-fuel ratio of the exhaust gas is determined to be the theoretical air-fuel ratio in Step S7.

When the engine 7 is not in the first selection state in Step S4, the CPU 162 determines whether or not the current state of the engine 7 is the second selection state based on the engine speed and the throttle opening acquired in Step S1 and the selection information stored in the RAM 164 (Step S9). When the engine 7 is in the second selection state, the CPU 162 closes the first shut-off valve 34 and opens the second shut-off valve 35 (step S10). After that, the CPU 162 proceeds to the process of Step S6.

When the engine 7 is not in the second selection state in Step S9, the CPU 162 determines that the current state of the engine 7 is the third selection state, and closes the first shut-off valve 34 and the second shut-off valve 35 (Step S11). After that, the CPU 162 returns to Step S1.

(5) Effects of the Present Preferred Embodiment

As described above, the amount of the secondary air to be supplied to the exhaust ports 12 (the exhaust pipe 13) is adjusted based on the state of the engine 7 in the present preferred embodiment. Specifically, when the amount of NOx exhausted from the engine 7 is small, the secondary air is supplied to the exhaust ports 12 so that the air-fuel ratio of the exhaust gas is lean. This efficiently removes unburned components (HC and CO) in the exhaust gas.

In addition, since the unburned components in the exhaust gas can be removed by the secondary air, the size of the catalyst device 13a can be reduced. As a result, the manufacturing cost of the motorcycle 100 can be reduced.

In the lean state, the air-fuel ratio of the exhaust gas in the exhaust ports 12 is preferably not less than about 15.

Moreover, when the amount of NOx exhausted from the engine 7 is large, the amount of the secondary air to be supplied to the exhaust ports 12 is adjusted so that the air-fuel ratio of the exhaust gas is the theoretical air-fuel ratio. Accordingly, the efficiency of purifying the exhaust gas by the catalyst device 13a can be improved.

When the engine 7 is at high load, the supply of the secondary air to the exhaust ports 12 is stopped. This prevents the increase in the temperature of the exhaust gas caused by the oxidation reaction of the unburned components. This results in the prevention of an excessive increase in the temperature of the catalyst device 13a, thus improving reliability of the catalyst device 13a.

In the present preferred embodiment, the first shut-off valve 34 and the second shut-off valve 35 are selectively opened, so that the amount of the secondary air supplied to the exhaust ports 12 (the exhaust pipe 13) can be easily brought close to the target secondary air amount. In this case, the amount of correction to the amount of injected fuel necessary for causing the air-fuel ratio of the exhaust gas to be the theoretical air-fuel ratio can be reduced. This stabilizes the output of the engine 7, improves drivability of the motorcycle 100 and improves fuel efficiency.

In addition, the secondary air is supplied from the passages 721 to 724 under a condition where an amount of an internal EGR (Internal Exhaust Gas Recirculation) is large, that is, when the engine 7 is at low speed and low load. In this case, the passages 721 to 724 are connected to the vicinity of the open ends 12a, respectively, thus allowing the secondary air to flow into the combustion chamber 751. This stabilizes the combustion of the air-fuel mixture in the combustion chamber 751. Note that the first shut-off valve 34 can be closed and the second shut-off valve 35 can be opened for preventing the secondary air from flowing into the combustion chamber 751.

Moreover, the first shut-off valve 34 is closed and the second shut-off valve 35 is opened under a predetermined condition. In this case, the oxidation reaction of the unburned components in the exhaust gas can be promoted while the increase in the temperature of the exhaust gas in the vicinity of the combustion chamber 751 can be prevented. This sufficiently purifies the exhaust gas and prevents heat transfer from the exhaust gas to the cylinder head 75. As a result, since the increase in the temperature of the cylinder head 75 can be prevented, degradation of the cylinder head 75 can be prevented.

In the present preferred embodiment, the second air supply pipe 73 is arranged on the front side of the cylinder head 75. In this case, heat of the second air supply pipe 73 and heat of the exhaust gas in the second air supply pipe 73 can be efficiently released from a front surface of the cylinder head 75. This prevents the increase in the temperature of the second air supply pipe 73 and the cylinder head 75. As a result, degradation of the second air supply pipe 73 and the cylinder head 75 can be reliably prevented.

(6) Modifications

While the air-fuel ratio of the exhaust gas is calculated by the CPU 162 based on the detected value of the oxygen sensor 31 in the above-described preferred embodiments, the air-fuel ratio of the exhaust gas may be calculated based on the amount of fuel injected by the injectors 82 and the amount of air taken into the combustion chamber 751. Note that the amount of the air taken into the combustion chamber 751 can be detected by providing intake air pressure sensors in the intake ports 9.

While the state of the engine 7 is determined based on the engine speed and the throttle opening in the above-described preferred embodiments, the method of determining the state of the engine 7 is not limited to the above-described examples. For example, pressure sensors may be provided in the intake ports 9, and the CPU 162 may determine the state of the engine 7 based on the pressure (negative pressure) in the intake ports 9 detected by the pressure sensors and the engine speed.

Moreover, NOx sensors may be provided in the exhaust ports 12 or the exhaust pipe 13, and the CPU 162 may determine the state of the engine 7 based on the amount of NOx detected by the NOx sensors, for example. Furthermore, temperature sensors may be provided in the vicinity of the open ends 12a of the exhaust ports 12, and the CPU 162 may determine the state of the engine 7 based on the temperature of the exhaust gas detected by the temperature sensors, for example.

While the first air supply pipe 72 and the second air supply pipe 73 are connected to the exhaust ports 12 in the above-described preferred embodiments, one or both of the first air supply pipe 72 and the second air supply pipe 73 may be connected to the exhaust pipe 13.

In addition, while the throttle valves 81 are electrically opened/closed by the CPU 162 in the above-described preferred embodiments, the throttle valves 81 may be mechanically opened/closed.

While description is made of a case where the one oxygen sensor 31 is preferably provided in the exhaust pipe 13 in the above-described preferred embodiments, the oxygen sensor 31 may be provided in each cylinder 74. For example, the oxygen sensor 31 may be provided in each of the passages 131 to 134.

While description is made of the secondary air supply system 1000 preferably including a four-cylinder engine in the above-described preferred embodiments, the engine 7 is not limited to a four-cylinder engine. For example, a two-cylinder engine, a six-cylinder engine, an eight-cylinder engine and the like may be used. The engine 7 may be a single-cylinder engine.

While the air-fuel ratio of the exhaust gas is preferably corrected by adjusting the amount of fuel injected by the injectors 82 in the above-described preferred embodiments, the air-fuel ratio of the exhaust gas may be corrected by adjusting the throttle opening or adjusting the throttle opening and the amount of injected fuel.

While the air cleaner box 8 is preferably used as the supply source of the secondary air in the above-described preferred embodiments, the supply source of the secondary air is not limited to the air cleaner box 8. The throttle body 10 may be used as the supply source of the secondary air, for example.

While description is made of a case where the secondary air supply system 1000 is preferably provided in the motorcycle 100 in the above-described preferred embodiments, the secondary air supply system 1000 may be provided in another vehicle such as a three wheeled vehicle or a four wheeled vehicle.

Note that the opening/closing of the first shut-off valve 34 and the second shut-off valve 35 preferably has hysteresis characteristics. In this case, unnecessary opening/closing of the first shut-off valve 34 and the second shut-off valve 35 can be prevented. This prevents degradation of the first shut-off valve 34 and the second shut-off valve 35.

The secondary air may be supplied so that the air-fuel ratio of the exhaust gas is not on the rich side (insufficient oxygen). In this case, the unburned components (HC and CO) in the exhaust gas can be prevented from being exhausted to the outside.

The sizes of the first air supply pipe 72 and the second air supply pipe 73, the positions where the check valves 36, 37 are arranged, and so on are determined so that the air fuel ratio of the exhaust gas in the exhaust ports 12 and the exhaust pipe 13 and the air-fuel ratio of the air-fuel mixture in the combustion chamber 751 can be set to respective desired values. For example, the above-mentioned sizes and the like are determined so that the first shut-off valve 34 and the second shut-off valve 35 are opened in the state where the air-fuel ratio of the air-fuel mixture is set to 13 to cause the air-fuel ratio of the exhaust gas to be 17.

Second Preferred Embodiment

Figure 12:
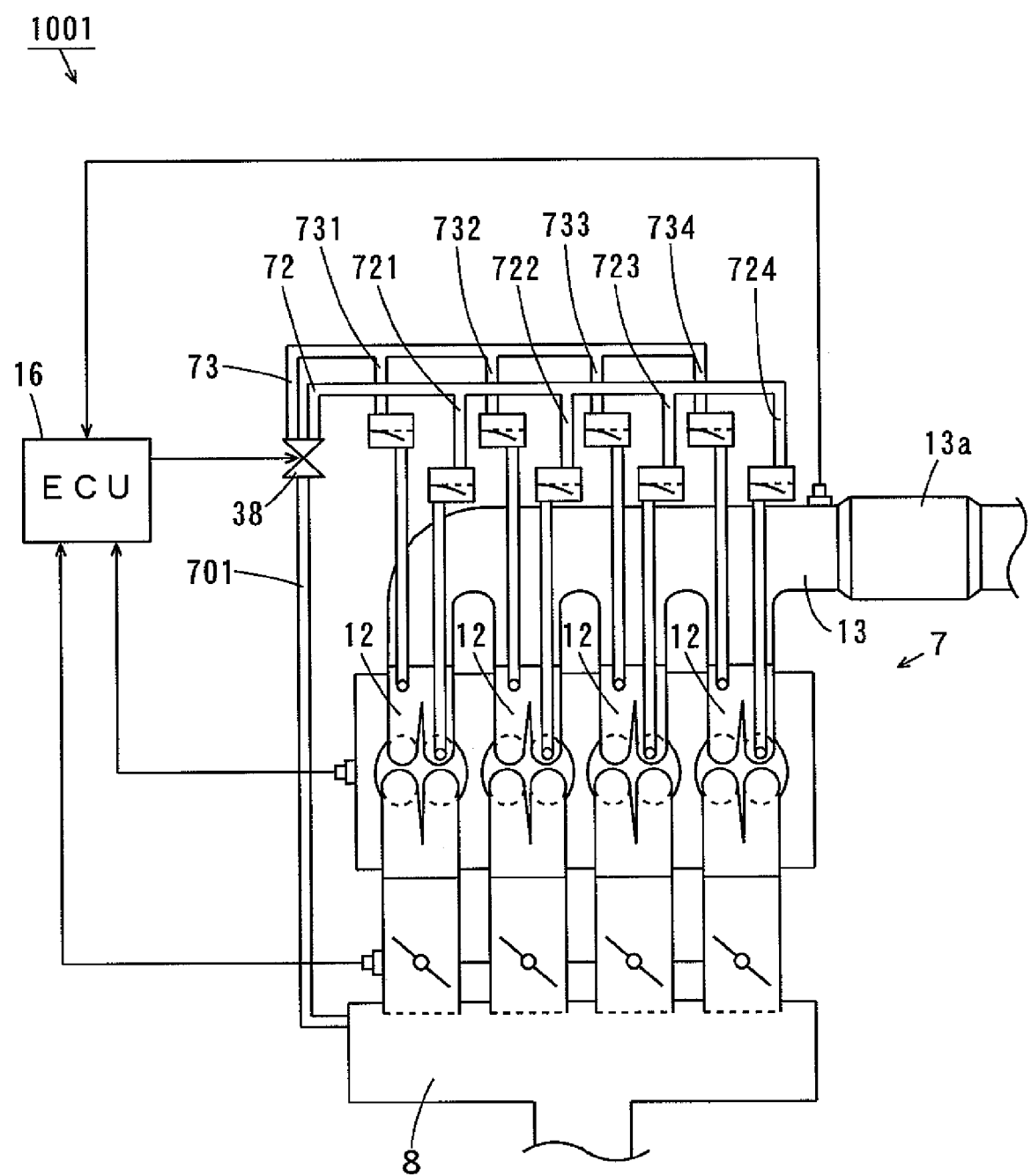
FIG. 12 is a schematic view showing a secondary air supply system according to a second preferred embodiment of the present invention.

FIG. 12 is a schematic view showing a secondary air supply system 1001 according to a second preferred embodiment of the present invention.

The secondary air supply system 1001 according to the second preferred embodiment is different from the secondary air supply system 1000 of FIG. 3 in the following points.

As shown in FIG. 12, a first common pipe 701, the first air supply pipe 72 and the second air supply pipe 73 are provided as a secondary air supply path from the air cleaner box 8 to the exhaust ports 12 in the present preferred embodiment.

One end of the first common pipe 701 is connected to the air cleaner box 8, and the other end of the first common pipe 701 is connected to a third shut-off valve 38. Respective first ends of the first air supply pipe 72 and the second air supply pipe 73 are connected to the third shut-off valve 38.

In the present preferred embodiment, the secondary air flowing from the air cleaner box 8 into the first common pipe 701 is supplied to the exhaust ports 12 through one or both of the first air supply pipe 72 and the second air supply pipe 73.

Figure 13A:
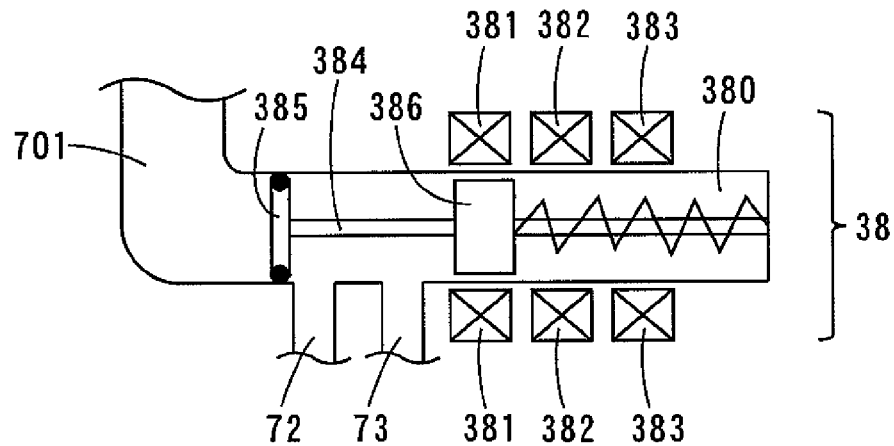
FIGS. 13A-13C are diagrams explaining an example of the configuration of a third shut-off valve.
Figure 13B:
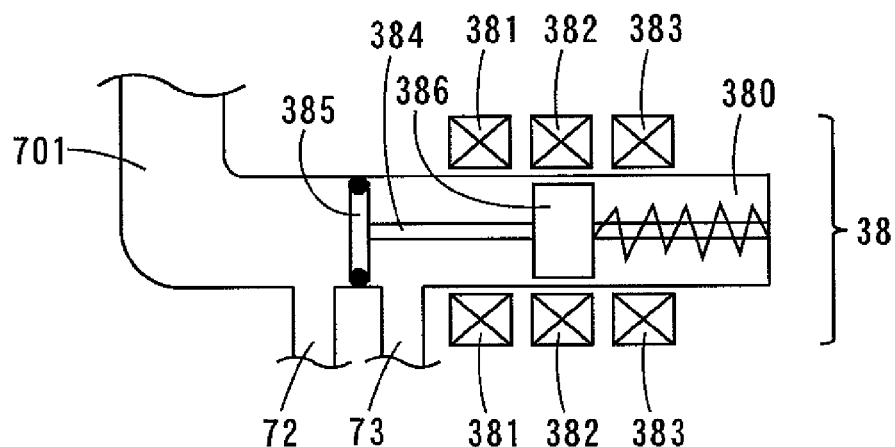
Figure 13C:
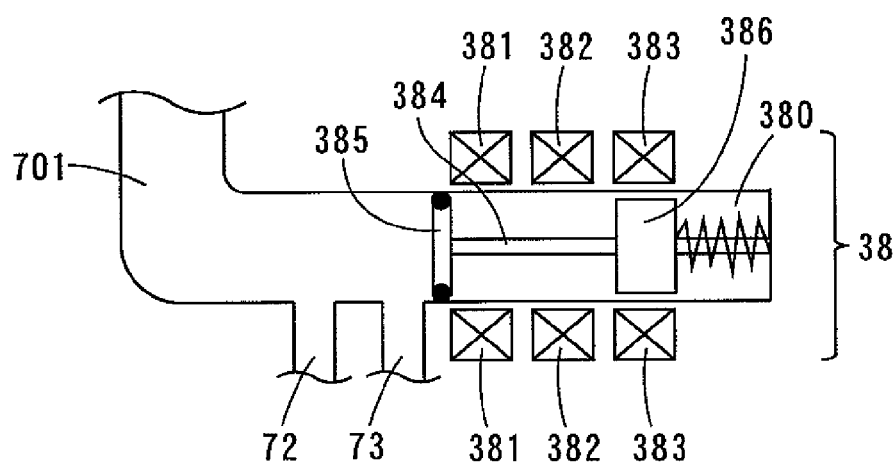

FIGS. 13A-13C are diagrams explaining an example of the configuration of the third shut-off valve 38. Note that FIG. 13A shows a state of the third shut-off valve 38 when shutting off the flow of the secondary air from the first common pipe 701 to the first and second air supply pipes 72, 73. FIG. 13B shows a state of the third shut-off valve 38 when allowing the flow of the secondary air from the first common pipe 701 to the first air supply pipe 72 and shutting off the flow of the secondary air from the first common pipe 701 to the second air supply pipe 73. FIG. 13C shows a state of the third shut-off valve 38 when allowing the flow of the secondary air from the first common pipe 701 to the first and second air supply pipes 72, 73.

As shown in FIGS. 13A-13C, the third shut-off valve 38 includes a cylinder 380, first magnetic coils 381, second magnetic coils 382, third magnetic coils 383, a valve rod 384, a shut-off plate 385, and a core 386.

The first common pipe 701 is connected to a first end of the cylinder 380, and the first air supply pipe 72 and the second air supply pipe 73 are connected to an outer periphery of the cylinder 380 on the first end. The first to third magnetic coils 381 to 383 are provided at an outer peripheral surface of the cylinder 380.

The valve rod 384 is accommodated within the cylinder 380. The shut-off plate 385 having a disk shape is provided at one end of the valve rod 384. The shut-off plate 385 is provided so as to slide along an inner peripheral surface of the cylinder 380. The core 386 is provided at the other end of the valve rod 384.

In this third shut-off valve 38, the first magnetic coils 381 to the third magnetic coils 383 are selectively energized by the CPU 162 (FIG. 2) so that an electromagnetic force is generated. This causes the core 386 to move to any position in the cylinder 380 of an inward position (FIG. 13A) of the first magnetic coils 381, an inward position (FIG. 13B) of the second magnetic coils 382, and an inward position (FIG. 13C) of the third magnetic coils 383.

As a result, the shut-off plate 385 moves to any position of a position (FIG. 13A) in which the shut-off plate 385 shuts off the flow of the secondary air from the first common pipe 701 to the first and second air supply pipes 72, 73, a position (FIG. 13B) in which the shut-off plate 385 allows the flow of the secondary air from the first common pipe 701 to the first air supply pipe 72 and shuts off the flow of the secondary air from the first common pipe 701 to the second air supply pipe 73, and a position (FIG. 13C) in which the shut-off plate 385 allows the flow of the secondary air from the first common pipe 701 to the first and second air supply pipes 72, 73.

As described above, the amount of the secondary air to be supplied to the exhaust ports 12 can be adjusted by the third shut-off valve 38 in the present preferred embodiment. In this case, since it is not necessary to provide a plurality of valves for adjusting the amount of the secondary air, the secondary air supply system 1001 can be made low in cost.

Note that positions of a connection portion (herein after referred to as a first connection portion) of the first air supply pipe 72 and the cylinder 380 and a connection portion (herein after referred to as a second connection portion) of the second air supply pipe 73 and the cylinder 380 are not limited to the examples of FIGS. 13A-13C. For example, the first connection portion and the second connection portion may be provided in positions opposite to those of FIGS. 13A-13C.

Third Preferred Embodiment

Figure 14:
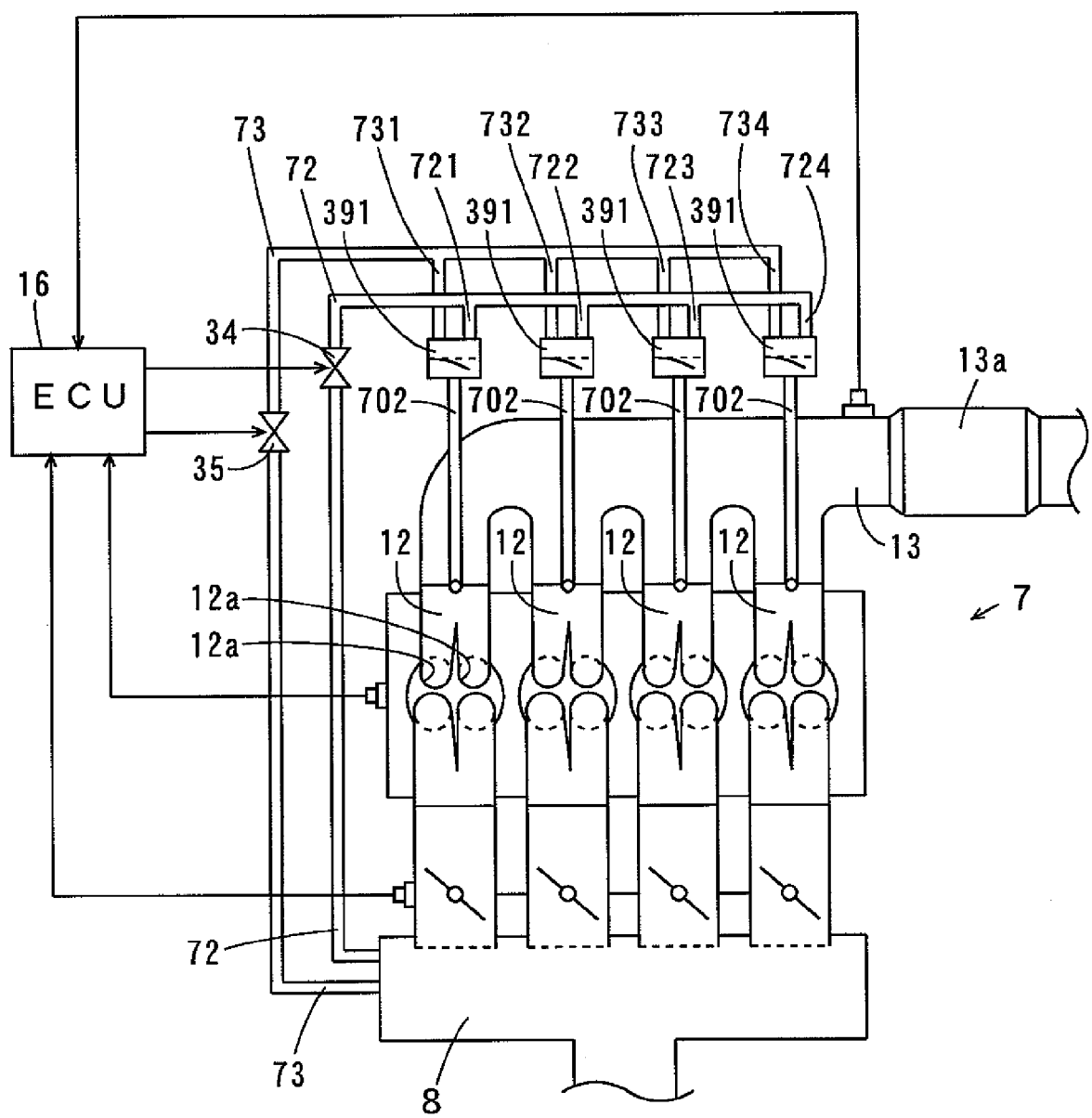
FIG. 14 is a schematic view showing a secondary air supply system according to a third preferred embodiment of the present invention.

FIG. 14 is a schematic view showing a secondary air supply system 1002 according to a third preferred embodiment.

The secondary air supply system 1002 according to the third preferred embodiment is different from the secondary air supply system 1000 of FIG. 3 in the following points.

As shown in FIG. 14, the first air supply pipe 72, the second air-supply pipe 73, and four second common pipes 702 are provided as the secondary air supply path from the air cleaner box 8 to the exhaust ports 12 in the present preferred embodiment.

Respective first ends of the passages 721 and 731 are connected to a common check valve 391, respective first ends of the passages 722 and 732 are connected to a common check valve 391, respective first ends of the passages 723 and 733 are connected to a common check valve 391, and respective first ends of the passages 724 and 734 are connected to a common check valve 391.

First ends of the second common pipes 702 are connected to the check valves 391, respectively. The other ends of the second common pipes 702 are connected to the exhaust ports 12, respectively.

In the present preferred embodiment, the secondary air flowing from the air cleaner box 8 to the first air supply pipe 72 and the second air supply pipe 73 joins at the check valve 391 and is then supplied to the exhaust ports 12 through the second common pipes 702.

In this case, the configuration of the secondary air supply system 1002 can be simplified because a plurality of supply pipes for supplying the secondary air to the exhaust ports 12 are not required to be connected to the exhaust ports 12.

Note that the second common pipes 702 may be connected to the exhaust ports 12, or may be connected to the exhaust pipe 13. Moreover, the second common pipes 702 may be connected to the vicinity of the open ends 12a, or may be connected to positions away from the open ends 12a.

Fourth Preferred Embodiment

Figure 15:
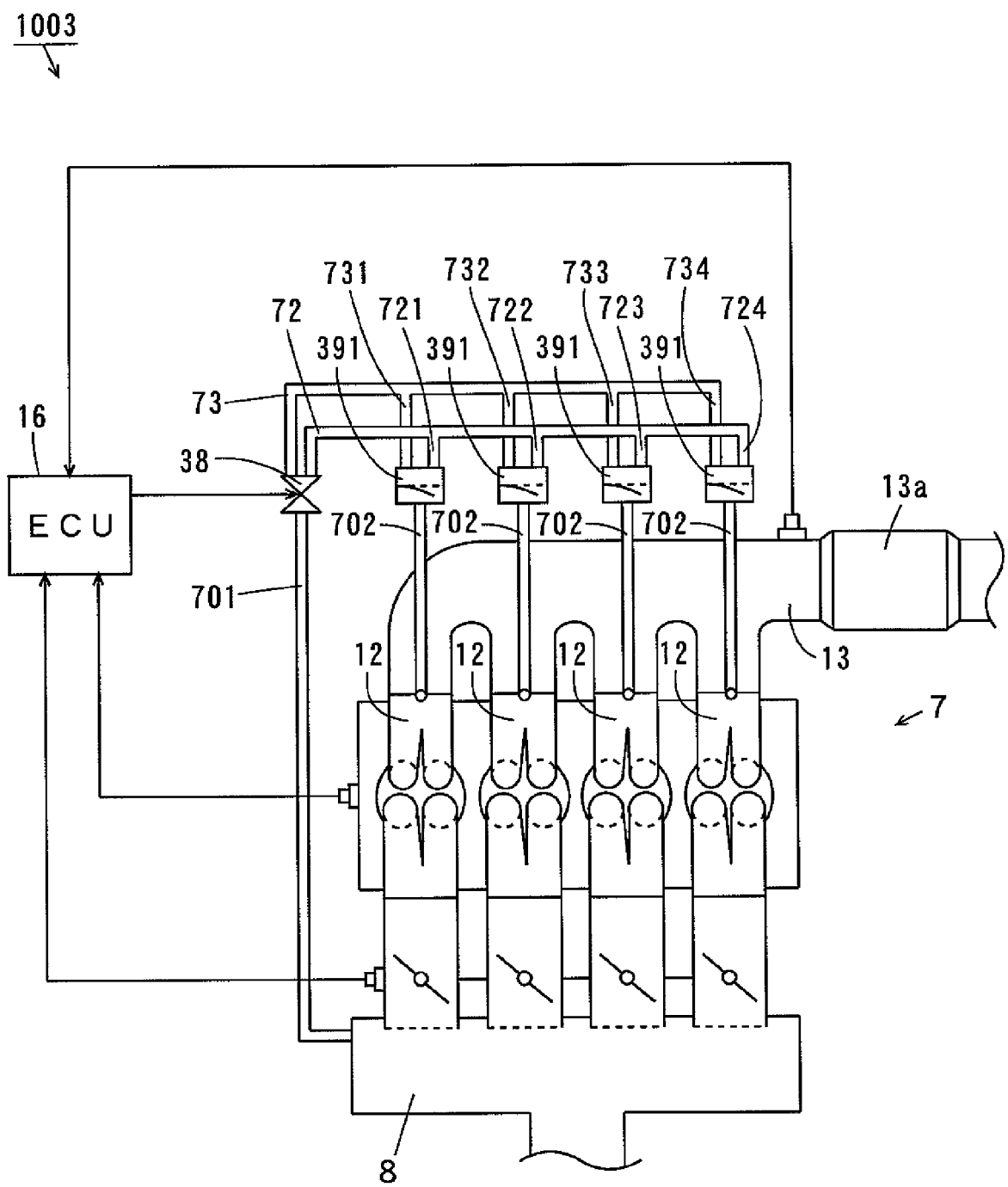
FIG. 15 is schematic view showing a secondary air supply system according to a fourth preferred embodiment of the present invention.

FIG. 15 is schematic view showing a secondary air supply system 1003 according to a fourth preferred embodiment.

The secondary air supply system 1003 according to the fourth preferred embodiment is different from the secondary air supply system 1001 of FIG. 12 in the following points.

As shown in FIG. 15, the first common pipe 701, the first air supply pipe 72, the second air supply pipe 73, and the four second common pipes 702 are provided as the secondary air supply path from the air cleaner box 8 to the exhaust ports 12 in the present preferred embodiment.

The respective first ends of the passages 721 and 731 are connected to the common check valve 391, the respective first ends of the passages 722 and 732 are connected to the common check valve 391, the respective first ends of the passages 723 and 733 are connected to the common check valve 391, and the respective first ends of the passages 724 and 734 are connected to the common check valve 391.

The first ends of the second common pipes 702 are connected to the check valves 391, respectively. The other ends of the second common pipes 702 are connected to the exhaust ports 12, respectively.

In the present preferred embodiment, the amount of the secondary air to be supplied to the exhaust ports 12 can be adjusted by the third shut-off valve 38. In this case, the secondary air supply system 1003 can be made low in cost because it is not necessary to provide a plurality of valves for adjusting the amount of the secondary air.

In addition, the secondary air flowing from the air cleaner box 8 to the first air supply pipe 72 and the second air supply pipe 73 joins at the check valve 391 and is then supplied to the exhaust ports 12 through the second common pipes 702.

In this case, the configuration of the secondary air supply system 1003 can be simplified because the plurality of supply pipes for supplying the secondary air to the exhaust ports 12 are not required to be connected to the exhaust ports 12.

Correspondences Between Elements in the Claims and Elements in the Preferred Embodiments of the Present Invention In the following paragraph, non-limiting examples of correspondences between various elements recited in the claims below and those described above with respect to various preferred embodiments of the present invention are explained.

In the above-described preferred embodiments, the exhaust port 12 and the exhaust pipe 13 are examples of an exhaust passage, the air cleaner box 8 or the throttle body 10 is an example of a supply source, the first air supply pipe 72 and the second air supply pipe 73 are examples of first and second paths, respectively, the CPU 162 is an example of an engine state determination device, the first shut-off valve 34 and the second shut-off valve 35 or the third shut-off valve 38 are examples of a path switching device, the lean state is an example of a first state, the first selection state and the second selection state are examples of a second state, the third selection state is an example of a third state, the ROM 163 or the RAM 164 is an example of a storage device, the NOx sensor is an example of a first detector, the injector 82 is an example of a fuel supply device, the oxygen sensor 31 is an example of a second detector, the rear wheel 18 is an example of a drive wheel, and the rear wheel driven sprocket 19 and the chain 20 are examples of a transmission mechanism.

As each of various elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A secondary air supply system that supplies secondary air to an exhaust passage of an engine, comprising:
    a supply source of the secondary air;
    first and second paths through which the secondary air is supplied from the supply source to the exhaust passage;
    an engine state determination device arranged to determine a state of the engine; and
    a path switching device arranged to selectively switch the first and second paths to a communicated state in which the first and second paths communicate the secondary air between the supply source and the exhaust passage, or a shut-off state in which the first and second paths do not communicate the secondary air between the supply source and the exhaust passage, respectively, based on the state of the engine determined by the engine state determination device; wherein
    the state of the engine includes a first state and a second state set in advance based on an amount of nitrogen oxide exhausted from a combustion chamber of the engine, and the amount of the nitrogen oxide in the first state is smaller than the amount of the nitrogen oxide in the second state; and
    the path switching device brings the first and second paths into the communicated state when the state of the engine is determined to be the first state by the engine state determination device, and brings either one of the first and second paths into the communicated state when the state of the engine is determined to be the second state by the engine state determination device.

2. The secondary air supply system according to claim 1, further comprising a throttle valve arranged adjust an intake air amount of the engine, wherein the engine state determination device determines the first state and the second state based on a rotational speed of the engine and an opening of the throttle valve.

3. The secondary air supply system according to claim 2, further comprising a storage device arranged to store information indicating a relationship among the rotational speed of the engine, the opening of the throttle valve, the first state, and the second state.

4. The secondary air supply system according to claim 1, wherein the engine state determination device determines the first state and the second state based on a rotational speed of the engine and a pressure in an intake port of the engine.

5. The secondary air supply system according to claim 1, further comprising a first detector arranged to detect the amount of the nitrogen oxide exhausted from the combustion chamber of the engine, wherein the engine state determination device determines the first state and the second state based on the amount of the nitrogen oxide detected by the first detector.

6. The secondary air supply system according to claim 1, wherein the state of the engine further includes a third state set in advance based on a load applied on the engine, the load in the third state is higher than a load in the first state and the second state, and the path switching device brings the first and second paths into the shut-off state when the state of the engine is determined to be the third state by the engine state determination device.

7. The secondary air supply system according to claim 1, further comprising:
    a fuel supply device arranged to supply fuel to the engine so that the air-fuel ratio in the combustion chamber of the engine is a predetermined value; and
    a second detector arranged to detect an oxygen concentration in the exhaust passage; wherein
    the fuel supply device corrects, when the engine is determined to be in the second state by the engine state determination device, an amount of the fuel supplied to the engine based on the oxygen concentration detected by the second detector so that the air-fuel ratio in the exhaust passage is approximately a theoretical air-fuel ratio.

8. The secondary air supply system according to claim 7, wherein the path switching device brings, when the state of the engine is determined to be the second state by the engine state determination device, either one of the first and second paths into the communicated state so that an amount of the correction by the fuel supply device is reduced.

9. The secondary air supply system according to claim 1, wherein at least one of the first and second paths is connected to the exhaust passage at a position within about 50 mm from a combustion chamber of the engine.

10. The secondary air supply system according to claim 1, wherein the air-fuel ratio in the exhaust passage is set to not less than about 15 by the secondary air supplied through the first and second paths.

11. A vehicle comprising:
   an engine;
   a drive wheel;
   a transmission mechanism arranged to transmit power generated by the engine to the drive wheel;
   an exhaust passage through which an exhaust gas exhausted from the engine flows;
   a catalyst device that is provided in the exhaust passage and arranged to purify the exhaust gas exhausted from the engine; and
   a secondary air supply system that supplies secondary air to the exhaust passage, wherein the secondary air supply system includes:
   a supply source of the secondary air;
   first and second paths through which the secondary air is supplied from the supply source to the exhaust passage;
   an engine state determination device arranged to determine a state of the engine; and
   a path switching device arranged to selectively switch the first and second paths to a communicated state in which the first and second paths communicate the secondary air between the supply source and the exhaust passage, or a shut-off state in which the first and second paths do not communicate the secondary air between the supply source and the exhaust passage, respectively, based on the state of the engine determined by the engine state determination device; wherein
   the state of the engine includes a first state and a second state set in advance based on an amount of nitrogen oxide exhausted from a combustion chamber of the engine, and the amount of the nitrogen oxide in the first state is smaller than the amount of the nitrogen oxide in the second state; and
   the path switching device brings the first and second paths into the communicated state when the state of the engine is determined to be the first state by the engine state determination device, and brings either one of the first and second paths into the communicated state when the state of the engine is determined to be the second state by the engine state determination device.

* * * * *